(12) United States Patent
Choi et al.

(10) Patent No.: US 11,568,875 B2
(45) Date of Patent: Jan. 31, 2023

(54) ARTIFICIAL INTELLIGENCE APPARATUS AND METHOD FOR RECOGNIZING PLURALITY OF WAKE-UP WORDS

(71) Applicant: LG ELECTRONICS INC., Seoul (KR)

(72) Inventors: Woojin Choi, Seoul (KR); Changhoe Kim, Seoul (KR); Jihoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 17/111,360

(22) Filed: Dec. 3, 2020

(65) Prior Publication Data
US 2022/0093105 A1    Mar. 24, 2022

(30) Foreign Application Priority Data
Sep. 18, 2020    (KR) .......................... 10-2020-0120742

(51) Int. Cl.
*G10L 15/32*    (2013.01)
*G06N 5/04*    (2006.01)
(Continued)

(52) U.S. Cl.
CPC .............. *G10L 15/32* (2013.01); *G06N 5/043* (2013.01); *G10L 15/08* (2013.01); *G10L 15/22* (2013.01);
(Continued)

(58) Field of Classification Search
USPC ...................................................... 704/1–504
See application file for complete search history.

(56) References Cited

U.S. PATENT DOCUMENTS

| 10,192,546 B1 * | 1/2019 | Piersol | ................... | G10L 17/22 |
| 11,132,991 B2 * | 9/2021 | Park | ....................... | G01S 11/14 |

(Continued)

FOREIGN PATENT DOCUMENTS

EP    3726856    10/2020

OTHER PUBLICATIONS

European Patent Office Application Serial No. 21154966.2, Search Report dated Jun. 2, 2021, 10 pages.

*Primary Examiner* — Marcus T Riley
(74) *Attorney, Agent, or Firm* — Lee, Hong, Degerman, Kang & Waimey PC

(57) ABSTRACT

Disclosed is an artificial intelligence apparatus for recognizing a plurality of wake-up words, including a microphone, a memory configured to store a first wake-up word recognition engine, a communication interface configured to communicate with a server storing a second wake-up word recognition engine, and a processor configured to acquire an audio signal through the microphone, generate a pre-processed audio signal from the acquired audio signal, extract a voice interval from the generated pre-processed audio signal, set a wake-up word recognition interval comprising the extracted voice interval and a buffer interval corresponding to the extracted voice interval in the generated pre-processed audio signal, wherein the wake-up word recognition interval is an interval used for recognizing wake-up words, and transmit the set wake-up recognition interval in the generated pre-processed audio signal to the first wake-up word recognition engine and the second wake-up word recognition engine.

13 Claims, 15 Drawing Sheets

(51) Int. Cl.
*G10L 15/08* (2006.01)
*G10L 15/22* (2006.01)
*G10L 15/30* (2013.01)
*G10L 25/78* (2013.01)

(52) U.S. Cl.
CPC .............. *G10L 15/30* (2013.01); *G10L 25/78* (2013.01); *G10L 2015/088* (2013.01); *G10L 2015/223* (2013.01)

(56) References Cited

U.S. PATENT DOCUMENTS

| | | | |
|---|---|---|---|
| 11,205,761 B2* | 12/2021 | Kim | H01L 51/5004 |
| 2018/0158460 A1* | 6/2018 | Lee | G10L 15/22 |
| 2018/0197540 A1* | 7/2018 | Lee | G10L 15/22 |
| 2018/0240456 A1* | 8/2018 | Jeong | G10L 15/005 |
| 2019/0043488 A1* | 2/2019 | Bocklet | G10L 15/22 |
| 2019/0156818 A1* | 5/2019 | Piersol | G10L 17/22 |
| 2020/0074988 A1* | 3/2020 | Park | G06N 3/08 |
| 2020/0105256 A1* | 4/2020 | Fainberg | G10L 15/32 |
| 2020/0336846 A1* | 10/2020 | Rohde | G10L 15/22 |
| 2021/0335354 A1* | 10/2021 | Park | G10L 15/063 |
| 2022/0051677 A1* | 2/2022 | Park | G06N 3/006 |
| 2022/0093105 A1* | 3/2022 | Choi | G06N 5/043 |

\* cited by examiner

FIG. 12
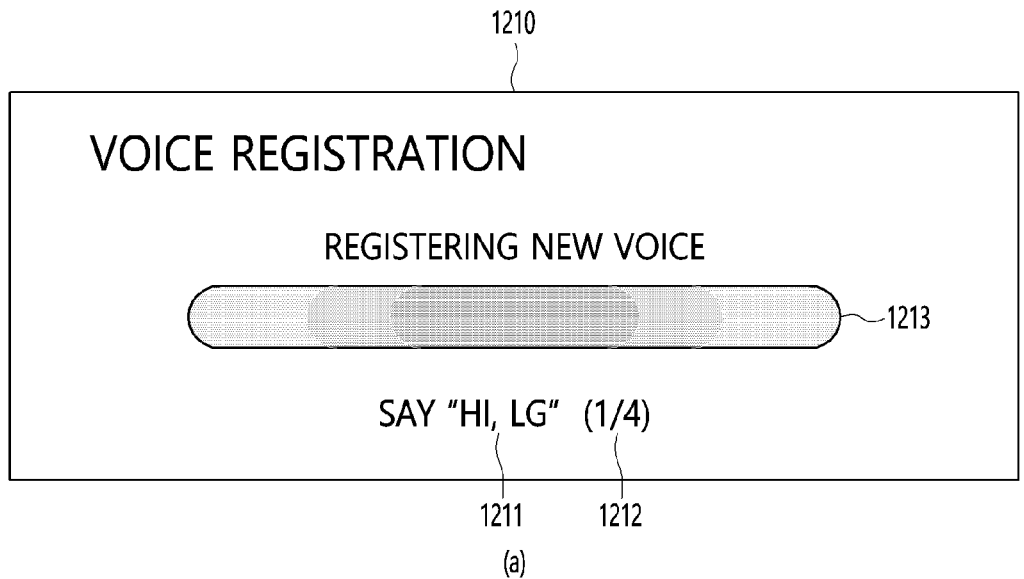
(a)
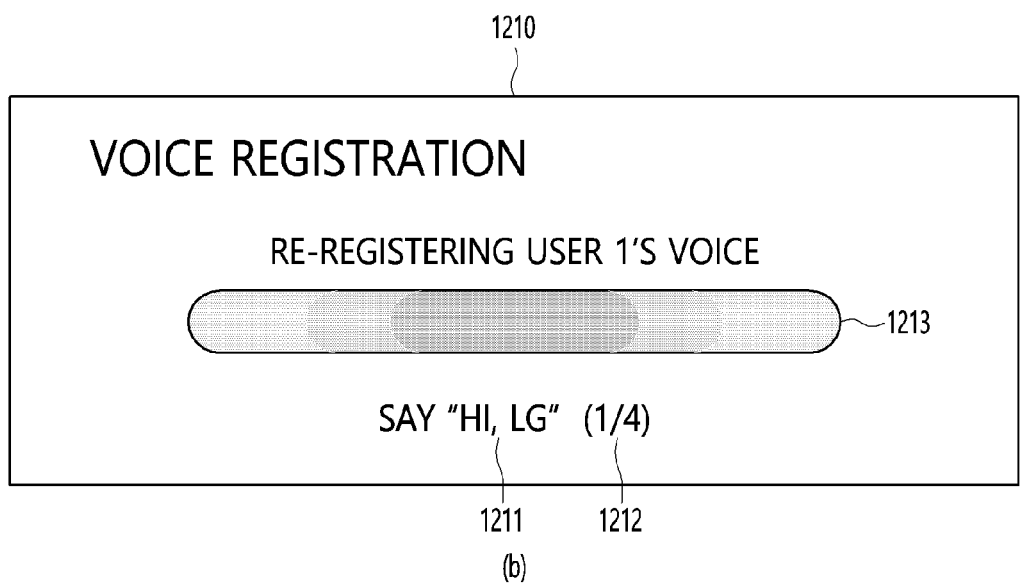
(b)

ARTIFICIAL INTELLIGENCE APPARATUS AND METHOD FOR RECOGNIZING PLURALITY OF WAKE-UP WORDS

CROSS-REFERENCE TO RELATED APPLICATIONS

Pursuant to 35 U.S.C. § 119(a), this application claims the benefit of earlier filing date and right of priority to Korean Patent Application No. 10-2020-0120742, filed on Sep. 18, 2020, the contents of which are hereby incorporated by reference herein in its entirety.

BACKGROUND

Field of the Invention

The present disclosure relates to an artificial intelligence apparatus and method for recognizing a plurality of wake-up words.

Discussion of the Related Art

Recently, artificial intelligence (AI) apparatuses equipped with a voice recognition function to recognize a user's spoken voice have increased. Such a voice recognition function is typically set to be activated by a predetermined button input, a touch input, or a voice input. In some implementations, voice input may refer to recognizing a predetermined wake-up word (or voice recognition wake-up word). A wake-up word recognition model for recognizing a voice recognition wake-up word is almost always activated because the voice recognition wake-up word is to be recognized for determining whether to activate a voice recognition function. Accordingly, several computing resources are required for performing wake-up word recognition.

Since different voice recognition platforms recognize different wake-up words using different wake-up word recognition engines, a single artificial intelligence apparatus should be equipped with a plurality of wake-up word recognition engines to support a plurality of voice recognition platforms. In addition, a plurality of wake-up word recognition engines should be operating at all times in order to recognize respective wake-up words. Accordingly, large computing resources are required for performing wake-up word recognition which may cause a problem by significantly increasing a share of a processor or a central processing unit (CPU). Here, the large share of the CPU based on the wake-up word recognition engine may cause the artificial intelligence apparatus to slow down execution of other high-load tasks. Conversely, recognition of a wake-up word may not operate normally when performing other high-load tasks.

SUMMARY

An aspect of the present disclosure is directed to providing an artificial intelligence apparatus and method for recognizing a plurality of voice recognition wake-up words.

Another aspect of the present disclosure is directed to providing an artificial intelligence apparatus and method for recognizing a plurality of voice recognition wake-up words in a partial interval of an input audio signal.

To achieve these and other advantages and in accordance with the purpose of the disclosure, as embodied and broadly described herein, there is provided An artificial intelligence apparatus for recognizing a plurality of wake-up words, the artificial intelligence apparatus comprising: a microphone; a memory configured to store a first wake-up word recognition engine; a communication interface configured to communicate with a server configured to store a second wake-up word recognition engine; and a processor configured to: acquire an audio signal through the microphone, generate a pre-processed audio signal from the acquired audio signal, extract a voice interval from the generated pre-processed audio signal, wherein the voice interval is associated with a portion of the audio signal corresponding to a voice, set a wake-up word recognition interval comprising the extracted voice interval and a buffer interval corresponding to the extracted voice interval in the generated pre-processed audio signal, wherein the wake-up word recognition interval is an interval used for recognizing wake-up words, and transmit the set wake-up recognition interval in the generated pre-processed audio signal to the first wake-up word recognition engine and the second wake-up word recognition engine.

The processor may be configured to extract the voice interval from the pre-processed audio signal through a voice activation detection (VAD) function.

The processor may be configured to set, as a first buffer interval, a preceding interval having a first length from the voice interval, to set, as a second buffer interval, a subsequent interval having a second length from the voice interval, and to set the wake-up word recognition interval including the voice interval, the first buffer interval, and the second buffer interval.

The processor may be configured to acquire a wake-up word recognition result for a first wake-up word through the first wake-up word recognition engine, and to acquire a wake-up word recognition result for a second wake-up word through the second wake-up word recognition engine.

The processor may be configured to deactivate the VAD function when the first wake-up word or the second wake-up word is recognized, to acquire a voice recognition result for a command recognition interval after a wake-up word interval for the recognized wake-up word in the pre-processed audio signal, to perform an operation based on the voice recognition result, and to activate the VAD function.

The processor may be configured to acquire the voice recognition result for the command recognition interval using speech engines of a voice recognition platform corresponding to the recognized wake-up word, and the speech engines may include a speech-to-text (STT) engine, a natural language processing (NLP) engine, and a voice synthesis engine.

The processor may be configured to transfer the wake-up word recognition interval to the artificial intelligence server through an application programming interface (API) for the second wake-up word recognition engine, and to acquire a wake-up word recognition result for the second wake-up word.

The processor may be configured to acquire a voice presence probability from the pre-processed audio signal using the VAD function, and to extract the voice interval using the voice presence probability.

The processor may be configured to extract, as the voice interval, an interval in which the voice presence probability is greater than a first reference value.

The processor may be configured to extract, as the voice interval, an interval in which a value obtained by multiplying an amplitude of the pre-processed audio signal and the voice presence probability is greater than a second reference value.

The processor may be configured to deactivate the VAD function when an operation mode is a voice registration mode, and to activate the VAD function after a voice registration function terminates.

In another aspect of the present disclosure, there is provided a method for recognizing a plurality of wake-up words, including: receiving an input audio signal through a microphone; generating a pre-processed audio signal from the input audio signal; extracting a voice interval from the pre-processed audio signal; setting a wake-up word recognition interval including the voice interval and a buffer interval corresponding to the voice interval in the pre-processed audio signal; and transferring the wake-up word recognition interval of the pre-processed audio signal to a first wake-up word recognition engine stored in a memory and a second wake-up word recognition engine stored in an artificial intelligence server.

According to various embodiments of the present disclosure, multiple voice recognition platforms may be supported in a single artificial intelligence apparatus by mounting a plurality of wake-up word recognition models.

In addition, according to various embodiments of the present disclosure, even if a plurality of wake-up word recognition models are mounted, resources consumed by a plurality of wake-up word recognition models in an idle state may be effectively reduced.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 12 is a view illustrating a voice registration interface according to an embodiment of the present disclosure.

DETAILED DESCRIPTION OF THE DISCLOSURE

Figure 1:
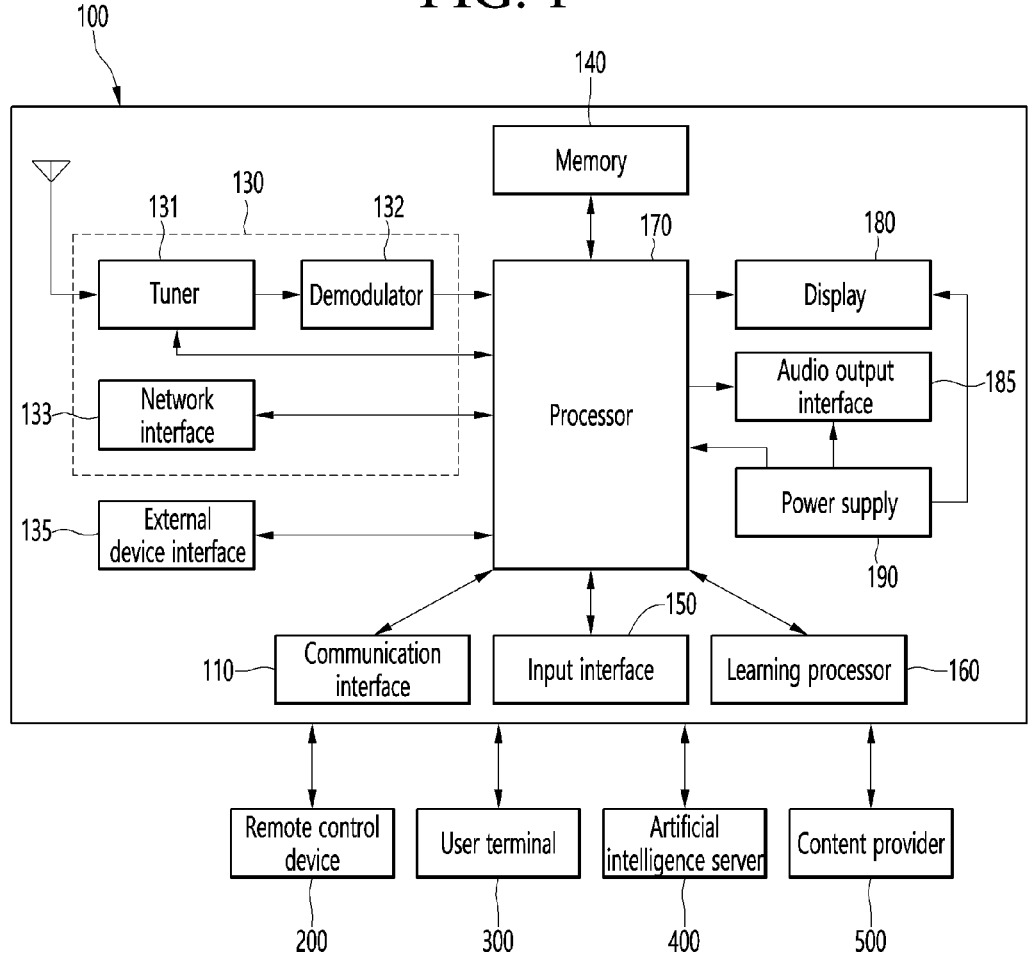
FIG. 1 is a block diagram illustrating an artificial intelligence apparatus 100 according to an embodiment of the present disclosure.

Hereinafter, embodiments of the present disclosure are described in more detail with reference to accompanying drawings and regardless of the drawings, symbols, same or similar components are assigned with the same reference numerals and thus overlapping descriptions for those are omitted. The suffixes 'module' and 'unit' for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms 'first' and 'second' are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former may be 'directly connected' to the latter, or 'electrically connected' to the latter via an intervening part (or element, device, etc.). It will be further understood that when one component is referred to as being 'directly connected' or 'directly linked' to another component, it means that no intervening component is present.

FIG. 1 is a block diagram illustrating an artificial intelligence apparatus 100 according to an embodiment of the present disclosure.

Referring to FIG. 1, the artificial intelligence apparatus 100 is connected to at least one of a remote control device 200, a user terminal 300, an artificial intelligence server 400, or a content provider 500 to be capable of transmitting and receiving data or signals.

The artificial intelligence apparatus 100 may be a display apparatus capable of displaying image including display 180 (or display panel). For example, the artificial intelligence apparatus 100 may be implemented by a stationary device or a mobile device, such as a television, a projector, a mobile phone, a smartphone, a desktop computer, a notebook, a digital broadcasting terminal, a personal digital assistant (PDA), a portable multimedia player (PMP), a navigation device, a tablet personal computer (PC), a wearable device, a set-top box (STB), a digital multimedia broadcasting (DMB) receiver, a radio, a speaker, a washing machine, a refrigerator, a desktop computer, a digital signage, a robot, a vehicle, and the like.

The user terminal 300 may be implemented as a mobile phone, a smart phone, a tablet PC, a laptop, a wearable device, a PDA, or the like. The user terminal 300 may be simply referred to as a terminal 300.

The content provider 500 refers to a device that provides content data corresponding to content to be output from the artificial intelligence apparatus 100, and the artificial intelligence apparatus 100 may receive content data from the content provider 500 to output content.

The artificial intelligence apparatus 100 may include a communication interface 110, a broadcast receiver 130, an external device interface 135, a memory 140, an input interface 150, a processor 170, a display 180, an audio output interface 185, and a power supply 190.

The communication interface 110 may communicate with external devices through wired or wireless communication. For example, the communication interface 110 may transmit and receive sensor information, a user input, a learning model, a control signal, and the like with external devices such as other display apparatus. Here, the other display apparatus 100 may be a mobile terminal such as a wearable device (for example, a smart view, smart glasses, a head mounted display (HMD)) and a smart phone capable of exchanging data (or interlocking) with the artificial intelligence apparatus 100 according to the present disclosure.

The communication interface 110 may detect (or recognize) a communicable wearable device around the artificial intelligence apparatus 100. Furthermore, if the detected wearable device is a device authenticated to communicate with the artificial intelligence apparatus 100, the processor 170 may transmit at least a part of data processed at the artificial intelligence apparatus 100 to the wearable device through the communication interface 110. Therefore, a user of the wearable device may use data processed at the artificial intelligence apparatus 100 through the wearable device.

The communication technology used by the communication interface 110 includes GSM (Global System for Mobile communication), CDMA (Code Division Multi Access), LTE (Long Term Evolution), fifth generation (5G), WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The communication interface 110 may be referred to as a communication modem.

The broadcast receiver 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program related data signals and restore the divided video signals, audio signals, and data signals to an output available form.

The external device interface 135 may receive an application or an application list in an adjacent external device and deliver it to the processor 170 or the memory 140.

The external device interface 135 may provide a connection path between the artificial intelligence apparatus 100 and an external device. The external device interface 135 may receive at least one an image or audio output from an external device that is wirelessly or wiredly connected to the artificial intelligence apparatus 100 and deliver it to the processor 170. The external device interface 135 may include a plurality of external input terminals. The plurality of external input terminals may include a Red Green Blue (RGB) terminal, at least one High Definition Multimedia Interface (HDMI) terminal, and a component terminal.

An image signal of an external device input through the external device interface 135 may be output through the display 180. A voice signal of an external device input through the external device interface 135 may be output through the audio output interface 185.

An external device connectable to the external device interface 135 may be one of a set-top box, a Blu-ray player, a DVD player, a game console, a sound bar, a smartphone, a PC, a USB Memory, and a home theater system, but this is just exemplary.

The network interface 133 may provide an interface for connecting the artificial intelligence apparatus 100 to a wired/wireless network including the Internet network. The network interface 133 may transmit or receive data to or from another user or another electronic device through an accessed network or another network linked to the accessed network.

Some content data stored in the artificial intelligence apparatus 100 may be transmitted to a user or an electronic device, which is selected from other users or other electronic devices pre-registered in the artificial intelligence apparatus 100.

The network interface 133 may access a predetermined webpage through an accessed network or another network linked to the accessed network. In other words, the network interface 133 may transmit or receive data to or from a corresponding server by accessing a predetermined webpage through the network.

The network interface 133 may receive contents or data provided from a content provider or a network operator. In other words, the network interface 133 may receive contents such as movies, advertisements, games, video on demand (VODs), and broadcast signals, which are provided from a content provider or a network provider, through network and information relating thereto.

The network interface 133 may receive firmware update information and update files provided from a network operator and transmit data to an Internet or content provider or a network operator.

The network interface 133 may select and receive a desired application among applications open to the public, through network.

The memory 140 may store signal-processed image, voice, or data signals stored by a program in order for each signal processing and control in the processor 170. For example, the memory 140 may store an input data acquired by an input interface 150, training data, learning model, training history and the like.

The memory 140 may perform a function for temporarily storing image, voice, or data signals output from the external device interface 135 or the network interface 133 and may store information on a predetermined image through a channel memory function.

The memory 140 may store an application or an application list input from the external device interface 135 or the network interface 133.

The artificial intelligence apparatus 100 may play content files (for example, video files, still image files, music files, document files, application files, and the like) stored in the memory 140 and provide them to a user.

The input interface 150 may acquire various kinds of data. The input interface 150 may include a camera for inputting a video signal, a microphone for receiving an audio signal, and a user input interface for receiving information from a user.

The user interface may deliver signals input by a user to the processor 170 or deliver signals from the processor 170 to a user. For example, the user interface may receive or process control signals such as power on/off, channel selection, and screen setting from the remote control device 200 or transmit control signals from the processor 170 to the remote control device 200 according to various communication methods such as Bluetooth, Ultra Wideband (WB), ZigBee, Radio Frequency (RF), and InfraRed (IR).

The user interface may deliver, to the processor 170, control signals input from local keys (not illustrated) such as a power key, a channel key, a volume key, and a setting key.

The learning processor 160 may train a model composed of an artificial neural network by using training data. The trained artificial neural network may be referred to as a learning model. The learning model may be used to an infer result value for new input data rather than training data, and the inferred value may be used as a basis for determination to perform a certain operation.

The learning processor 160 may perform AI processing together with the learning processor 440 of the AI server 400.

The learning processor 160 may include a memory integrated or implemented in the artificial intelligence apparatus 100. Alternatively, the learning processor 160 may be implemented by using the memory 170, an external memory directly connected to the artificial intelligence apparatus 100, or a memory held in an external device.

Image signals that are image-processed in the processor 170 may be input to the display 180 and displayed as an image corresponding to corresponding image signals. Additionally, image signals that are image-processed in the processor 170 may be input to an external output device through the external device interface 135.

Voice signals processed in the processor 170 may be output to the audio output interface 185. Additionally, voice signals processed in the processor 170 may be input to an external output device through the external device interface 135.

The processor 170 may control overall operations in the artificial intelligence apparatus 100.

The processor 170 may control the artificial intelligence apparatus 100 by a user command or internal program input through the user interface and download a desired application or application list into the artificial intelligence apparatus 100 in access to network.

The processor 170 may output channel information selected by a user together with processed image or voice signals through the display 180 or the audio output interface 185.

According to an external device image playback command received through the user interface, the processor 170 may output image signals or voice signals of an external device such as a camera or a camcorder, which are input through the external device interface 135, through the display 180 or the audio output interface 185.

The processor 170 may cause the display 180 to display images. For example, the processor 170 may control the display 180 to display broadcast images input through the tuner 131, external input images input through the external device interface 135, images input through the network interface 133, or images stored in the memory 140. In this case, an image displayed on the display 180 may be a still image or video and also may be a 2D image or a 3D image.

The processor 170 may play content stored in the artificial intelligence apparatus 100, received broadcast content, and external input content input from the outside, and the content may be in various formats such as broadcast images, external input images, audio files, still images, accessed web screens, and document files.

The processor 170 may determine at least one executable operation of the artificial intelligence apparatus 100 based on information determined or generated by using a data analysis algorithm or a machine learning algorithm. Then, the processor 170 may control the components of the artificial intelligence apparatus 100 to execute the determined operation.

To this end, the processor 170 may request, search, receive, or utilize data of the learning processor 160 or the memory 140. The processor 170 may control the components of the artificial intelligence apparatus 100 to execute the predicted operation or the operation determined to be desirable among the at least one executable operation.

The processor 170 may acquire intention information for the user input and may determine the user's requirements based on the acquired intention information.

The processor 170 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 160, may be learned by the learning processor 440 of the AI server 400, or may be learned through distributed processing.

The processor 170 may collect history information including the operation contents of the artificial intelligence apparatus 100 or the user's feedback on the operation and may store the collected history information in the memory 150 or the learning processor 160 or transmit the collected history information to the external device such as the AI server 400. The collected history information may be used to update the learning model.

The display 180 may convert image signals, data signals, or on-screen display (OSD) signals, which are processed in the processor 170, or images signals or data signals, which are received in the external device interface 135, into R, G, and B signals to generate driving signals.

Meanwhile, the artificial intelligence apparatus 100 illustrated in FIG. 1 is an embodiment of the present disclosure and thus, some of the components illustrated may be integrated, added, or omitted according to the specification of the actually implemented display apparatus 100.

In an embodiment, two or more components may be integrated into one component or one component may be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the artificial intelligence apparatus 100 may receive images through the network interface 133 or the external device interface 135 and play them without including the tuner 131 and the demodulator 132. For example, the artificial intelligence apparatus 100 may be divided into an image processing device such as a set-top box for receiving broadcast signals or contents according to various network services and a content playback device for playing contents input from the image processing device. In this case, an operating method for a display apparatus according to an embodiment of the present disclosure described below may be performed by one of the display apparatus described with reference to FIG. 1, an image processing device such as the separated set-top box, and a content playback device including the display 180 and the audio output interface 185.

Figure 2:
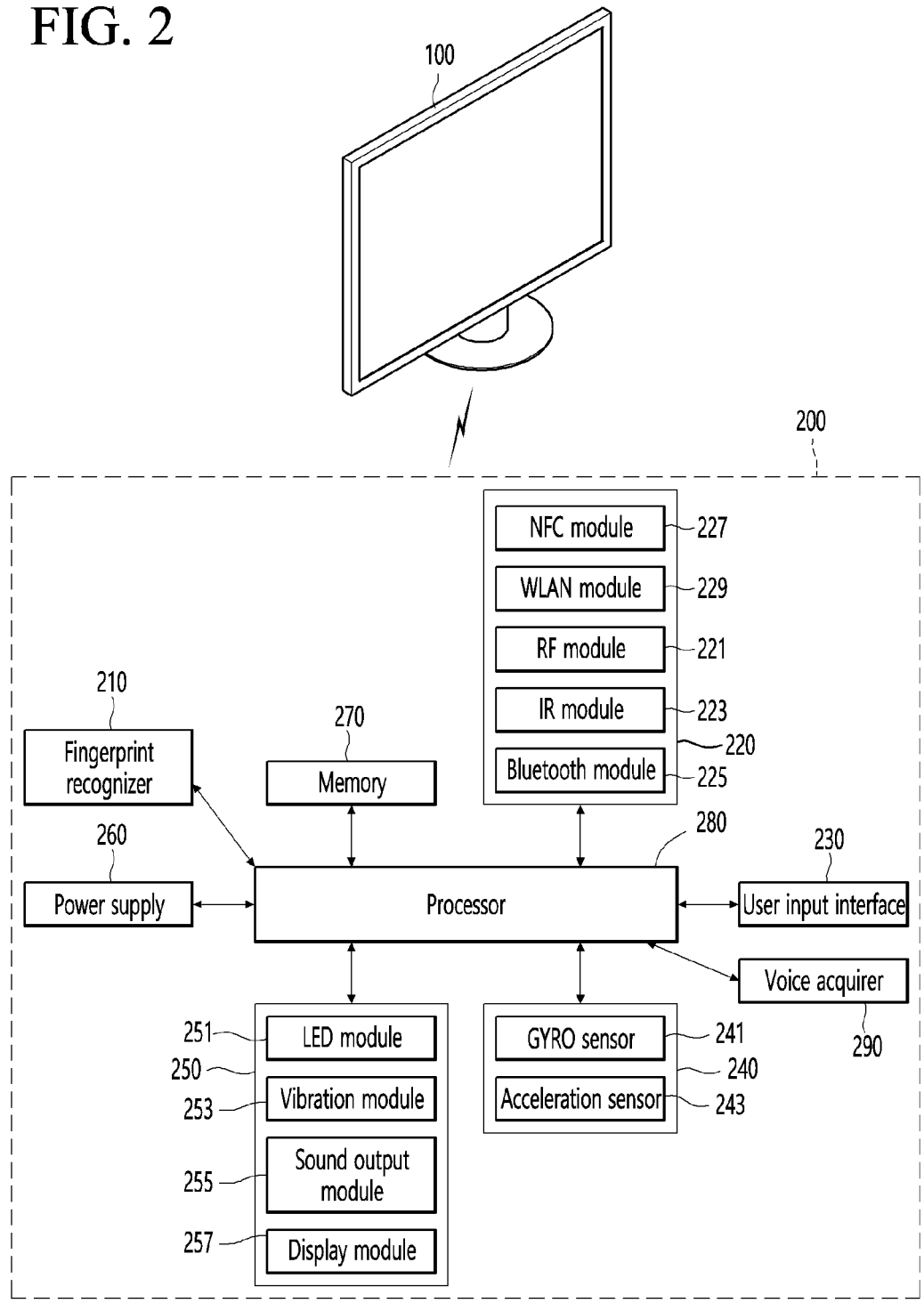
FIG. 2 is a block diagram illustrating a remote control device 200 according to an embodiment of the present disclosure.

FIG. 2 is a block diagram illustrating a remote control device 200 according to an embodiment of the present disclosure.

Referring to FIG. 2, a remote control device 200 may include a fingerprint recognizer 210, a communication interface 220, a user input interface 230, a sensor 240, an output interface 250, a power supply 260, a memory 270, a processor 280, and a voice acquirer 290.

The communication interface 220 may transmit/receive signals to/from an arbitrary any one of display apparatuses 100 according to the above-mentioned embodiments of the present disclosure.

The remote control device 200 may include a radio frequency (RF) module 221 for transmitting/receiving signals to/from the artificial intelligence apparatus 100 according to the RF communication standards and an IR module 223 for transmitting/receiving signals to/from the artificial intelligence apparatus 100 according to the IR communication standards. Additionally, the remote control device 200 may include a Bluetooth module 225 for transmitting/receiving signals to/from the artificial intelligence apparatus 100 according to the Bluetooth communication standards. Additionally, the remote control device 200 may include a Near Field Communication (NFC) module 227 for transmitting/receiving signals to/from the artificial intelligence apparatus 100 according to the NFC communication standards and a WLAN module 229 for transmitting/receiving signals to/from the artificial intelligence apparatus 100 according to the Wireless LAN (WLAN) communication standards.

The remote control device 200 may transmit signals containing information on a movement of the remote control device 200 to the artificial intelligence apparatus 100 through the communication interface 220.

The remote control device 200 may receive signals transmitted from the artificial intelligence apparatus 100 through the RF module 221 and if necessary, may transmit a command on power on/off, channel change, and volume change to the artificial intelligence apparatus 100 through the IR module 223.

The user input interface 230 may be configured with a keypad button, a touch pad, or a touch screen. A user may operate the user input interface 230 to input a command relating to the artificial intelligence apparatus 100 to the remote control device 200. If the user input interface 230 includes a hard key button, a user may input a command relating to the artificial intelligence apparatus 100 to the remote control device 200 through the push operation of the hard key button.

If the user input interface 230 includes a touch screen, a user may touch a soft key of the touch screen to input a command relating to the artificial intelligence apparatus 100 to the remote control device 200. Additionally, the user input interface 230 may include various kinds of input means operated by a user, for example, a scroll key and a jog key.

The sensor 240 may include a gyro sensor 241 or an acceleration sensor 243, and the gyro sensor 241 may sense information on a movement of the remote control device 200. For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor configured to sense a distance of the remote control device 200 with respect to the display 180 of the artificial intelligence apparatus 100.

The output interface 250 may output image or voice signals corresponding to operation of the user input interface 230 or corresponding to signals transmitted from the artificial intelligence apparatus 100. A user may recognize whether the user input interface 230 is operated or the artificial intelligence apparatus 100 is controlled through the output interface 250. For example, the output interface 250 may include an LED module 251 for flashing, a vibration module 253 for generating vibration, a sound output module 255 for outputting sound, or a display module 257 for outputting an image, if the user input interface 230 is operated or signals are transmitted/received to/from the artificial intelligence apparatus 100 through the communication interface 225.

The power supply 260 may supply power to the remote control device 200. The power supply 260 may stop the power supply if the remote control device 200 does not move for a predetermined time to reduce power waste. The power supply 260 may resume the power supply if a predetermined key provided at the remote control device 200 is operated.

The memory 270 may store various kinds of programs and application data necessary for control or operation of the remote control device 200.

If the remote control device 200 transmits/receives signals wirelessly to/from the artificial intelligence apparatus 100 through the RF module 221, the remote control device 200 and the artificial intelligence apparatus 100 transmits/receives signals through a predetermined frequency band. To this end, the processor 280 of the remote control device 200 may store, in the memory 270, information on a frequency band for transmitting/receiving signals to/from the artificial intelligence apparatus 100 paired with the remote control device 200 and refer to it.

The processor 280 may control general matters relating to control of the remote control device 200. The processor 280 may transmit a signal corresponding to a predetermined key operation of the user input interface 230 or a signal corresponding to movement of the remote control device 200 sensed by the sensor 240 to the artificial intelligence apparatus 100 through the communication interface 225.

The voice acquirer 290 of the remote control device 200 may obtain voice. The voice acquirer 290 may include at least one microphone 291 and obtain voice through the microphone 291.

Figure 3:
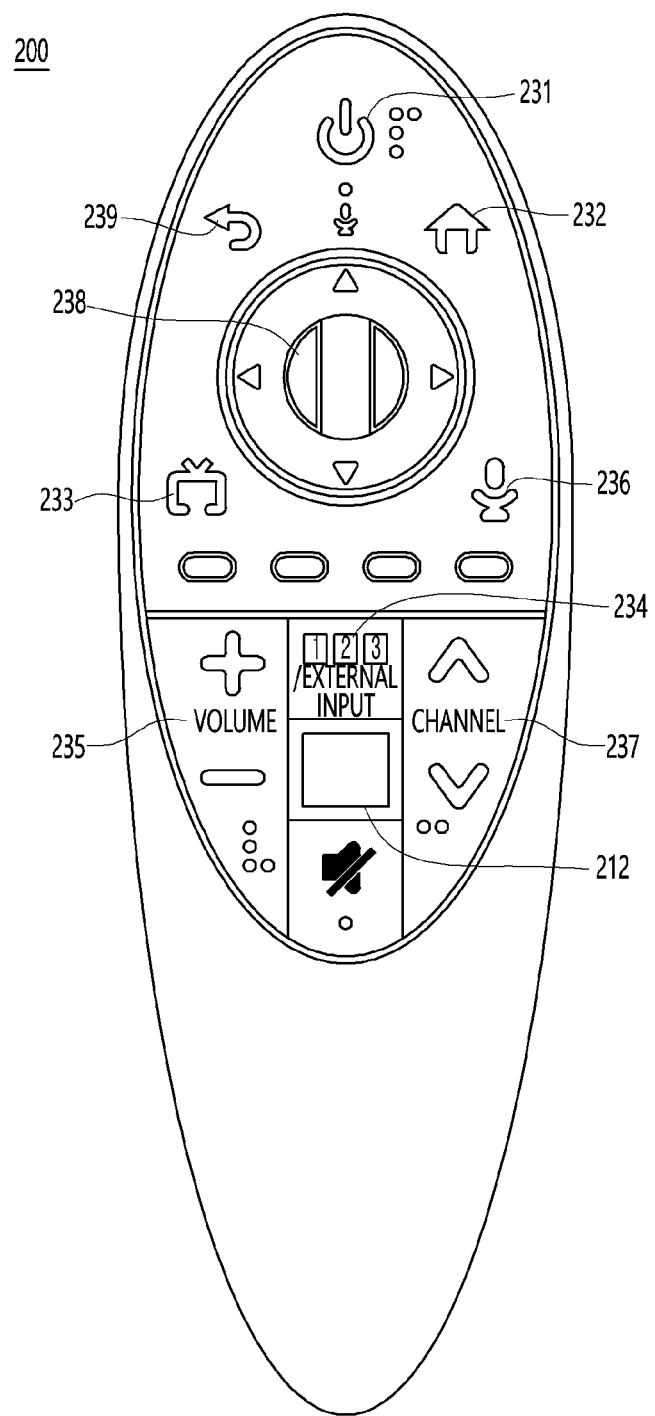
FIG. 3 is a view illustrating a remote control device 200 according to an embodiment of the present disclosure.

FIG. 3 is a view illustrating a remote control device 200 according to an embodiment of the present disclosure.

Referring to FIG. 3, the remote control device 200 may include a plurality of buttons. The plurality of buttons may include at least a fingerprint recognition button 212, a power button 231, a home button 232, a live button 233, external input buttons 234, volume adjustment buttons 235, a voice recognition button 236, channel change buttons 237, a check button 238, or a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be button for turning on/off the power of the artificial intelligence apparatus 100. The home button 232 may be a button for moving to the home screen of the artificial intelligence apparatus 100. The live button 233 may be a button for displaying live broadcast programs. The external input buttons 234 may be buttons for receiving an external input connected to the artificial intelligence apparatus 100. The volume adjustment buttons 235 may be buttons for adjusting the volume of a sound output from the artificial intelligence apparatus 100. The voice recognition button 236 may be a button for receiving user's voice and recognizing the received voice. The channel change buttons 237 may be buttons for receiving broadcast signals of a specific broadcast channel. The check button 238 may be a button for selecting a specific function and the back button 239 may be a button for returning to a previous screen.

Figure 4:
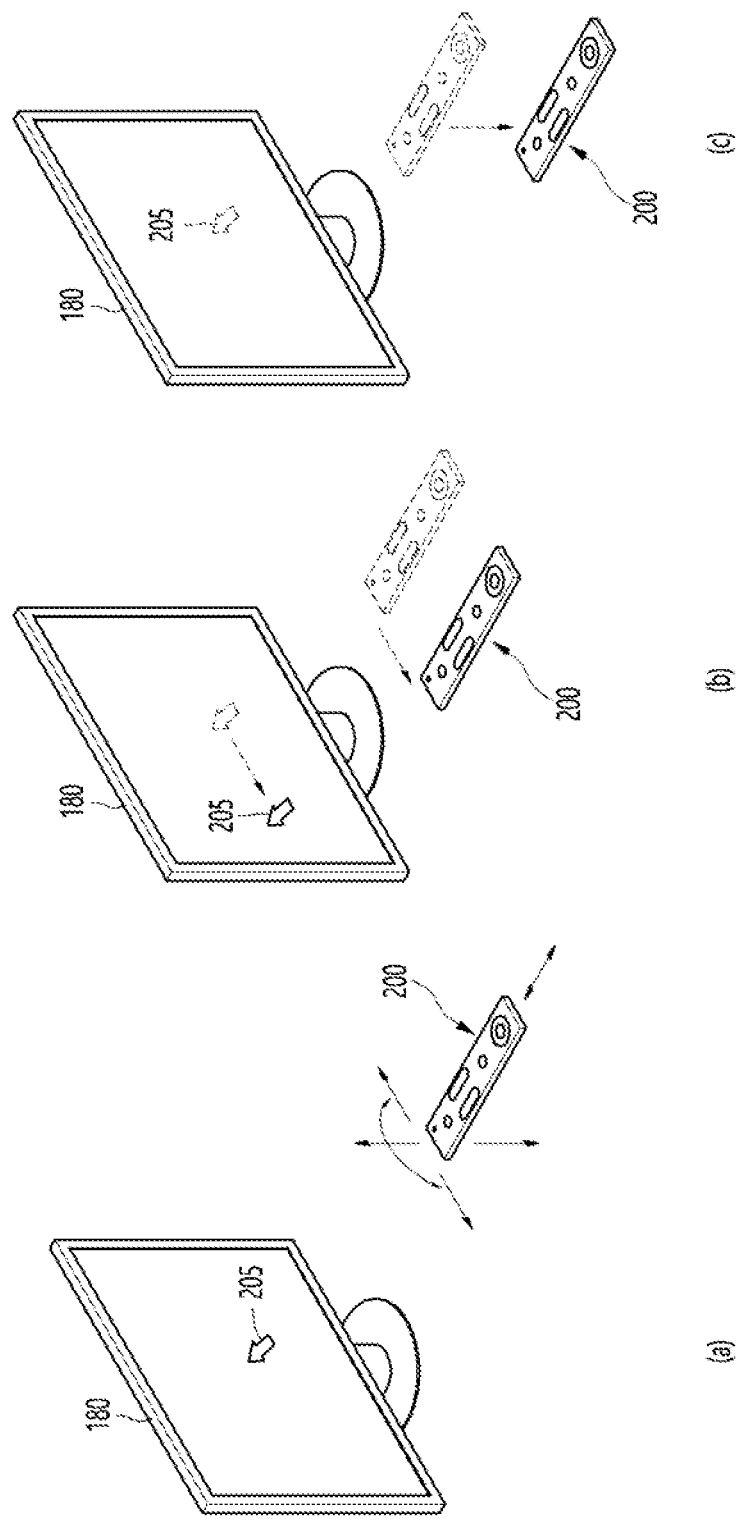
FIG. 4 is a view illustrating an example of interacting with the artificial intelligence apparatus 100 through the remote control device 200 in an embodiment of the present disclosure.

FIG. 4 is a view illustrating an example of interacting with the artificial intelligence apparatus 100 through a remote control device 200 in an embodiment of the present disclosure.

Referring to FIG. 4, a pointer 205 corresponding to the remote control device 200 may be displayed on the display 180.

Referring to FIG. 4(*a*), a user may move or rotate the remote control device 200 vertically or horizontally.

The pointer 205 displayed on the display 180 of the artificial intelligence apparatus 100 may move according to a movement of the remote control device 200. Since the corresponding pointer 205 is moved and displayed according to a movement on a 3D space, the remote control device 200 may be referred to as a spatial remote control device.

Referring to FIG. 4(*b*), if a user moves the remote control device 200, the pointer 205 displayed on the display 180 of the artificial intelligence apparatus 100 may be moved to the left according to the movement of the remote control device 200.

Information on a movement of the remote control device 200 detected through a sensor of the remote control device 200 may be transmitted to the artificial intelligence apparatus 100. The artificial intelligence apparatus 100 may calculate the coordinates of the pointer 205 from the information on the movement of the remote control device 200, and display the pointer 205 to match the calculated coordinates.

Referring to FIG. 4(*c*), when a user moves the remote control device 200 away from the display 180 while pressing a specific button in the remote control device 200, a selection area in the display 180 corresponding to the pointer 205 may be zoomed in and displayed larger. On the contrary, when the user moves the remote control device 200 to approach the display 180 while pressing a specific button in the remote control device 200, the selection area in the display 180 corresponding to the pointer 205 may be zoomed out and displayed smaller.

Meanwhile, if the remote control device 200 is moved away from the display 180, a selection area may be zoomed out and if the remote control device 200 is moved closer to the display 180, a selection area may be zoomed in.

Additionally, if a specific button in the remote control device 200 is pressed, recognition of a vertical or horizontal movement may be excluded. In other words, if the remote control device 200 is moved away from or closer to the display 180, the up, down, left, or right movement may not be recognized and only the back and forth movement with respect to the display 180 may be recognized. While a specific button in the remote control device 200 is not pressed, only the pointer 205 is moved according to the up, down, left or right movement of the remote control device 200.

The moving speed or moving direction of the pointer 205 may correspond to the moving speed or moving direction of the remote control device 200.

The pointer 205 may mean an object displayed on the display 180 in response to an operation of the remote control device 200. Accordingly, besides an arrow form displayed as the pointer 205 in the FIG. 4, various forms of objects are also possible. For example, the pointer 205 may include a point, a cursor, a prompt, and a thick outline. Then, the pointer 205 may be displayed in correspondence to one point of a horizontal axis and a vertical axis on the display 180 and also may be displayed in correspondence to a plurality of points such as a line and a surface.

Figure 5:
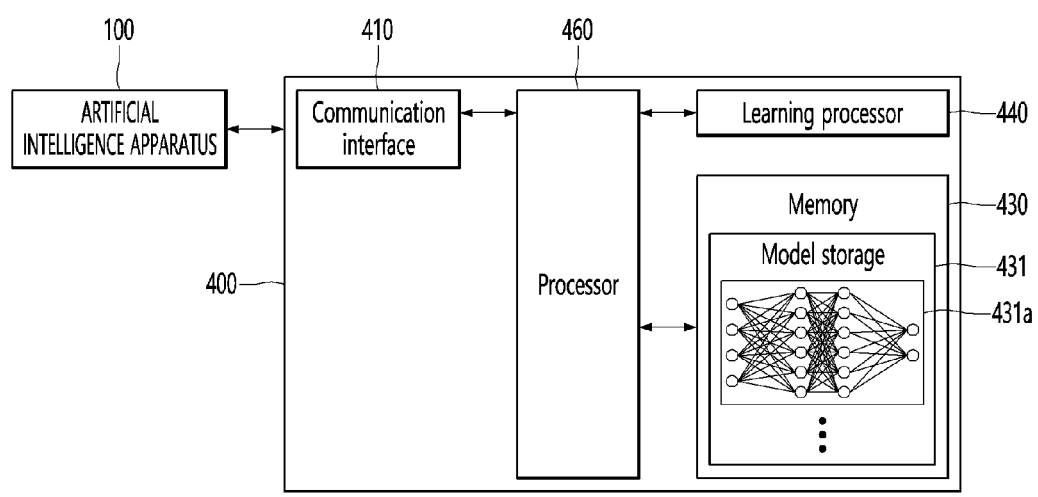
FIG. 5 is a block diagram illustrating an artificial intelligence server 400 according to an embodiment of the present disclosure.

FIG. 5 is a block diagram illustrating an artificial intelligence server 400 according to an embodiment of the present disclosure.

Referring to FIG. 5, the AI server 400 may refer to a device that learns an artificial neural network by using a machine learning algorithm or uses a learned artificial neural network. The AI server 400 may include a plurality of servers to perform distributed processing, or may be defined as a 5G network.

The AI server 400 may perform at least part of the AI processing of the artificial intelligence apparatus 100. The AI processing may mean a process required to train an AI model.

The AI server 400 may include a communication interface 410, a memory 430, a learning processor 440, a processor 460, and the like.

The communication interface 410 may transmit and receive data to and from an external device such as the artificial intelligence apparatus 100.

The memory 430 may include a model storage 431. The model storage 431 may store a learning or learned model (or an artificial neural network 431*a*) through the learning processor 440.

The learning processor 440 may learn the artificial neural network 431*a* by using the training data. The learning model may be used in a state of being mounted on the AI server 400 of the artificial neural network, or may be used in a state of being mounted on an external device such as the artificial intelligence apparatus 100.

The learning model may be implemented in hardware, software, or a combination of hardware and software. If all or part of the learning models are implemented in software, one or more instructions that constitute the learning model may be stored in memory 430.

The processor 460 may infer the result value for new input data by using the learning model and may generate a response or a control command based on the inferred result value.

The process of performing voice recognition includes recognizing a voice recognition wake-up word for activating a voice recognition function and recognizing a spoken voice while the voice recognition function is activated. The voice recognition wake-up word may be a preset word (especially set by a manufacturer or developer).

In general, for speech spoken while the voice recognition function is activated, a speech engine (e.g., STT engine, NLP engine, NLU engine, etc.) that recognizes a general spoken voice requires a larger amount of computation and is more complex than a wake-up word recognition engine that recognizes a specific voice recognition wake-up word since the speech engine should recognize various sentences including various words, rather than a preset word. Accordingly, when the processor 170 has sufficient computing power, the artificial intelligence apparatus 100 may directly recognize the general spoken voice using the speech engine, and when the processor 170 has insufficient computing power, the artificial intelligence apparatus 100 may recognize a general spoken voice through an external artificial intelligence server 400.

In contrast, the wake-up word recognition engine for recognizing a voice recognition wake-up word is sufficient to recognize only a preset wake-up word because it requires a smaller amount of computation and is less complex than a speech engine that recognizes a general spoken voice. Accordingly, the artificial intelligence apparatus 100 may recognize the voice recognition wake-up word using the wake-up word recognition engine configured on the artificial intelligence apparatus 100 even without the support of the external artificial intelligence server 400.

Figure 6:
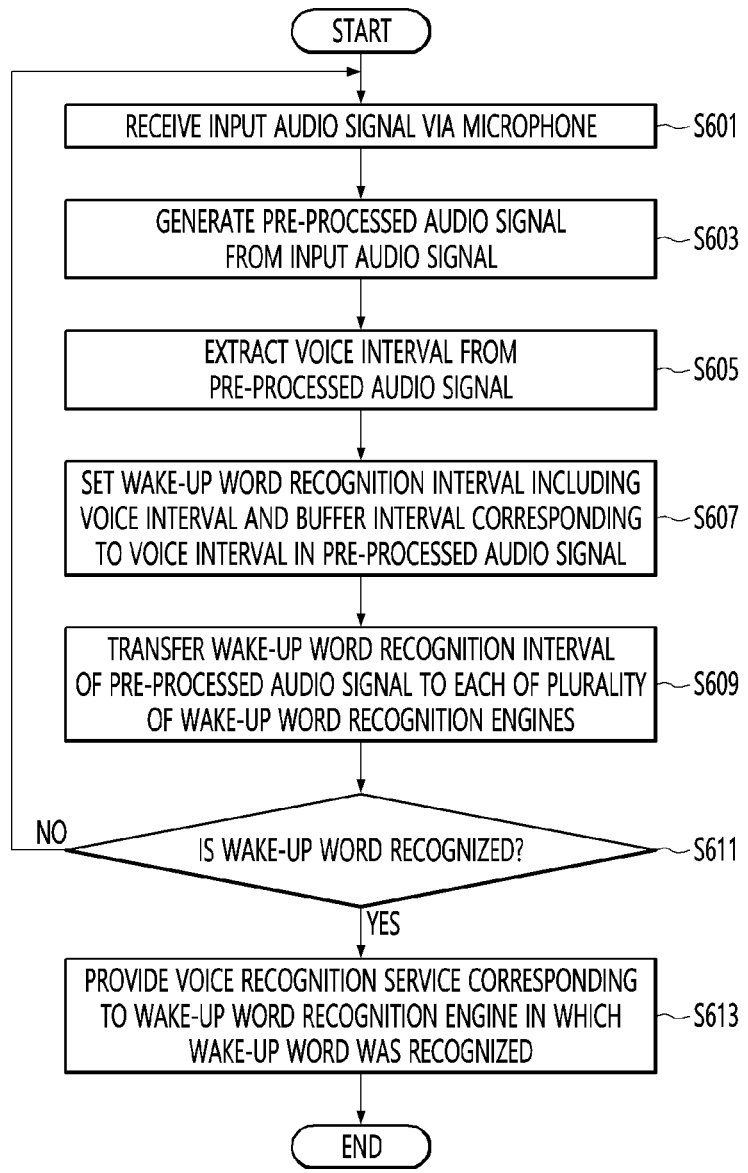
FIG. 6 is a flowchart illustrating a method for recognizing a plurality of voice recognition wake-up words according to an embodiment of the present disclosure.

FIG. 6 is a flowchart illustrating a method for recognizing a plurality of voice recognition wake-up words according to an embodiment of the present disclosure.

Referring to FIG. 6, the processor 170 of the artificial intelligence apparatus 100 is configured to receive an input audio signal through a microphone (S601).

The artificial intelligence apparatus 100 may operate a microphone (not shown) at all times to provide a voice recognition function, and the processor 170 may receive an input audio signal at all times through the microphone (not shown) to provide a voice recognition function. The input audio signal may be referred to as an input audio stream since the input audio signal is received at all times.

The input audio signal may or may not include a user's voice. In addition, even if the user's voice is included in the input audio signal, the voice recognition wake-up word may be or may not be included in the input audio signal.

Then, the processor 170 of the artificial intelligence apparatus 100 is configured to generate a pre-processed audio signal from the input audio signal (S603).

Pre-processing of the input audio signal may include noise removal and voice enhancement. All sounds except the user's voice may be regarded as noise, and noise may include not only ambient noise but also sound output from the audio output interface 185 of the artificial intelligence apparatus 100.

The processor 170 may remove a sound (or an audio signal) corresponding to an output audio signal from the input audio signal in consideration of the output audio signal output through the audio output interface 185. Also, the processor 170 may remove noise included in the input audio signal using a noise removal engine including a band pass filter or the like.

Hereinafter, the audio signal may refer to a pre-processed audio signal.

Also, the processor 170 of the artificial intelligence apparatus 100 is configured to extract a voice interval from the pre-processed audio signal (S605).

The processor 170 may extract a voice interval, which is an interval including a voice, from the pre-processed audio signal.

In an embodiment, the processor 170 may extract a voice interval from the pre-processed audio signal through voice activation detection (VAD). VAD may refer to an ability or function to distinguish between a voice interval including a voice and a non-voice interval without a voice in the pre-processed audio signal. The non-voice interval may refer to only an interval in which the user's voice is not included at all in the pre-processed audio signal or may refer to an interval including an interval in which a magnitude of the user's voice is smaller than a reference value.

In addition, the processor 170 of the artificial intelligence apparatus 100 is configured to set a wake-up word recognition interval including a voice interval and a buffer interval corresponding to the voice interval in the pre-processed audio signal (S607).

The wake-up word recognition interval may include a voice interval and a buffer interval corresponding to the voice interval and may refer to an interval transferred to the wake-up word recognition engines in order to recognize a wake-up word in the pre-processed audio signal. In other words, the wake-up word recognition interval may refer to an interval in which there is a possibility of including the wake-up word in the pre-processed audio signal.

The buffer interval may include a first buffer interval configured as a preceding interval having a first length from the extracted voice interval and a second buffer interval configured as a subsequent interval having a second length from the extracted voice interval. The first buffer interval may be referred to as a preceding buffer interval, and the second buffer interval may be referred to as a subsequent buffer interval. For example, the first buffer interval may be set to 4 seconds or the like, and the second buffer interval may be set to 2 to 3 seconds or the like.

Since the wake-up word recognition engines determine whether the wake-up word is spoken relative to a surrounding sound, if the wake-up word is recognized using only the voice interval, recognition accuracy may be lower as compared to a case where the wake-up word is recognized using the voice interval and a neighboring interval. In order to prevent this, the processor 170 may set a wake-up word recognition interval including not only the voice interval but also the first buffer interval and the second buffer interval corresponding to the voice interval.

The processor 170 may be configured to set the wake-up word recognition interval including all voice intervals, and may be configured to set the wake-up word recognition interval additionally including a first buffer interval and a second buffer interval corresponding to each voice interval. Accordingly, if another voice interval or a first buffer interval of the other voice interval overlaps the second buffer interval corresponding to a specific voice interval, both voice intervals and an interval therebetween may be included in the wake-up word recognition interval.

The processor 170 of the artificial intelligence apparatus 100 may be configured to transfer the wake-up word recognition interval of the pre-processed audio signal to each of the plurality of wake-up word recognition engines (S609).

The wake-up word recognition engines may be stored in the memory 140 of the artificial intelligence apparatus 100 or may be stored in an external server. According to an embodiment, the plurality of wake-up word recognition engines may be stored in the memory 140, some of them may be stored in the memory 140, or all of them may be stored in an external server. When each of the wake-up word recognition engines are stored in an external server, the wake-up word recognition engines may be stored in different external servers.

Each voice recognition platform of the plurality of wake-up word recognition engines is called by different wake-up words which are individually set, and the artificial intelligence apparatus 100 may be configured to recognize a wake-up word using the wake-up word recognition engine stored in the memory 140 or an external server. To this end, the processor 170 may be configured to transmit a wake-up word recognition interval in the pre-processed audio signal to each of the plurality of wake-up word recognition engines.

The processor 170 may be configured to transfer the wake-up word recognition interval of the pre-processed audio signal to each of the plurality of wake-up word recognition engines and recognize a wake-up word corresponding to each wake-up word recognition engine in the wake-up word recognition interval through each wake-up word recognition engine. For example, a first wake-up word recognition engine may recognize one or more first wake-up words corresponding to a first wake-up word recognition engine in the wake-up word recognition interval, and a second wake-up word recognition engine may recognize one or more second wake-up words corresponding to a second wake-up word recognition engine in the wake-up word recognition interval.

When the wake-up word recognition engine is stored in the memory 140, the processor 170 may recognize the wake-up word in the wake-up word recognition interval directly using the wake-up word recognition engine. When the wake-up word recognition engine is stored in an external server, the processor 170 may transfer only the wake-up word recognition interval to the external server through the communication interface 110 and receive a wake-up word recognition result from the external server.

Since the processor 170 transfers only the wake-up word recognition interval of the pre-processed audio signal to the wake-up word recognition engines, it is sufficient for the wake-up word recognition engines to operate only when the wake-up word recognition interval is transferred, rather than to operate at all times. Accordingly, resources required by the wake-up word recognition engines are reduced, thus lowering a share of the processor 170 of the wake-up word recognition engines.

Also, the processor 170 is configured to determine whether the wake-up word is recognized (S611).

If it is determined that even one of the plurality of wake-up word recognition engines has recognized the wake-up word, the processor may determine that the wake-up word has been recognized.

It may not desirable to have a situation in which a plurality of voice recognition platforms operate at the same time. Instead, it may be desirable to have a situation in which only one wake-up word recognition engine recognizes a wake-up word. If it is determined that two or more wake-up word recognition engines have recognized their respective wake-up words, the processor 170 may select one wake-up word recognition engine from among two or more wake-up word recognition engines that have recognized the wake-up word, and determine that the wake-up word has been recognized only in the selected wake-up word recognition engine.

If it is determined that two or more wake-up word recognition engines have recognized their respective wake-up words, the processor 170 may be configured to select only one recognized wake-up word and to activate only a voice recognition platform corresponding to the selected wake-up word based on predetermined priority among the voice recognition platforms (or wake-up word recognition engines) or based on a wake-up word recognition score (or wake-up recognition accuracy) of the wake-up word recognition engine.

For example, if the first wake-up word recognition engine has a higher priority than the second wake-up word recognition engine and both the first wake-up word recognition engine and the second wake-up word recognition engine recognize their respective wake-up word, the processor 170 may determine that only the first wake-up word recognition engine having a higher priority has recognized the wake-up word and may activate only the first voice recognition platform corresponding to the first wake-up word recognition engine. As another example, if both the first wake-up word recognition engine and the second wake-up word recognition engine have recognized their respective wake-up word, a wake-up word recognition score of the first wake-up word recognition engine is 0.8, and a wake-up word recognition score of the second wake-up word recognition engine is 0.9, the processor 170 may determine that only the second wake-up word recognition engine having a higher wake-up word recognition score has recognized the wake-up word, and may activate only the second voice recognition platform corresponding to the second wake-up word recognition engine.

If the wake-up word is not recognized as a result of the determination in step S611, the process returns to step S601 and the processor 170 receives an input audio signal through a microphone.

If the wake-up word is recognized as a result of the determination in step S611, the processor 170 is configured to provide a voice recognition service of the voice recognition platform corresponding to the wake-up word recognition engine which has recognized the wake-up word (S613).

Providing a voice recognition service of a specific voice recognition platform may refer to recognizing a user's voice based on the corresponding voice recognition platform and performing control suitable for the recognized voice or providing a response. Providing a voice recognition service of a specific voice recognition platform may refer to activating a specific voice recognition platform or a voice recognition service of the specific voice recognition platform. To this end, the processor 170 may recognize the user's voice included in the pre-processed audio signal using the voice engines of the voice recognition platform, and may perform appropriate control or provide a response based thereon.

The speech engines that recognize the user's voice in the voice recognition platform include a speech-to-text (STT) engine that converts a spoken voice included in the pre-processed audio signal into text, a natural language processing (NLP) engine that determines an intention of a spoken sentence converted into text, a voice synthesis engine or text-to-speech (TTS) engine for synthesizing a response generated based on the determined intention into speech. The voice engines may be stored in the memory 140 or in an external server (e.g., artificial intelligence server 400).

The processor 170 may be configured to provide a voice recognition service corresponding to a specific voice recognition platform using voice engines stored in the memory 140 or voice engines stored in an external server.

The order of steps shown in FIG. 6 is only an example and the present disclosure is not limited thereto. That is, in an embodiment, the order of some of the steps shown in FIG. 6 may be interchanged and performed. In addition, in an embodiment, some of the steps shown in FIG. 6 may be performed in parallel. In addition, only some of the steps shown in FIG. 6 may be performed.

FIG. 6 shows a cycle of a method for recognizing a plurality of voice recognition wake-up words, and the method for recognizing a plurality of voice recognition wake-up words shown in FIG. 6 may be repeatedly performed. That is, after performing step S613 of providing the voice recognition service, step S601 of receiving the input audio signal may be performed again.

Figure 7:
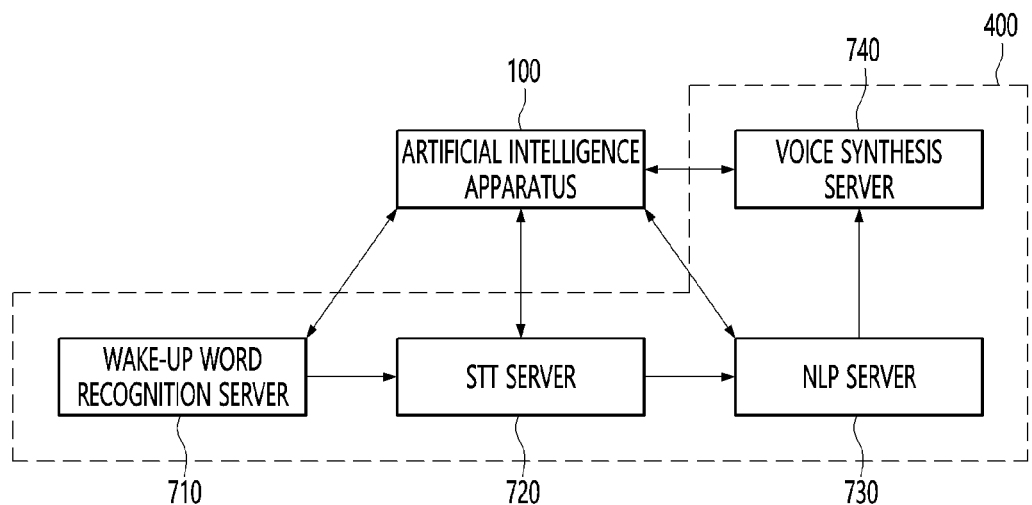
FIG. 7 is a view illustrating voice servers according to an embodiment of the present disclosure.

FIG. 7 is a view illustrating voice servers according to an embodiment of the present disclosure.

Referring to FIG. 7, the artificial intelligence apparatus 100 may communicate with one or more voice servers for providing a voice recognition service. The voice servers may include a wake-up word recognition server 710 that recognizes a wake-up word included in an audio signal using a wake-up word recognition engine, an STT server 720 that converts a spoken voice included in the audio signal into text using an STT engine, an NLP server 730 that determines the intention of a spoken sentence converted into text using an NLP engine, and a voice synthesis server 740 that synthesizes a response generated based on the determined intention into speech using the TTS engine. Determining control or response corresponding to the intention of the spoken sentence may be performed by the NLP server 730 or by the voice synthesis server 740.

These voice servers may exist separately for each voice recognition platform, and the artificial intelligence apparatus 100 may provide a voice recognition service by communicating with the voice servers corresponding to the activated voice recognition platform. For example, when a first voice recognition platform is activated, the artificial intelligence apparatus 100 may provide a voice recognition service by communicating with a first STT server 720, a first NLP server 730, and a first voice synthesis server 740 corresponding to the first voice recognition platform.

The wake-up word recognition server 710, the STT server 720, the NLP server 730, and the voice synthesis server 740 may be configured as separate servers that are distinguished from each other, but two or more thereof may be configured as one server. For example, the wake-up word recognition server 710, the STT server 720, the NLP server 730, and the voice synthesis server 740 may be configured as one artificial intelligence server 400, and in this case, the wake-up word recognition server 710, the STT server 720, the NLP server 730, and the voice synthesis server 740 may refer to individual functions of the artificial intelligence server 400.

Figure 8:
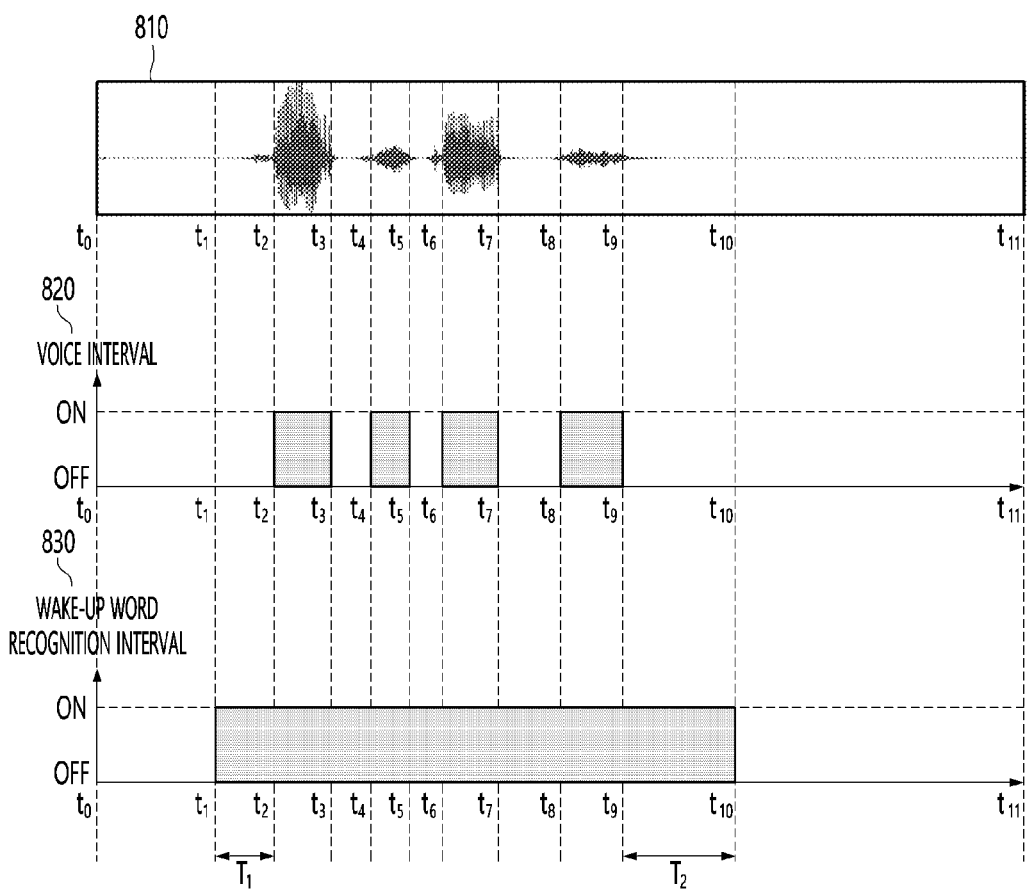
FIG. 8 is a view illustrating an example of a pre-processed audio signal and a wake-up word recognition interval corresponding thereto.

FIG. 8 is a view illustrating an example of a pre-processed audio signal and a wake-up word recognition interval corresponding thereto.

Referring to FIG. 8, when the processor 170 acquires the pre-processed audio signal 810, the processor 170 may extract a voice interval 820 through VAD.

In the example shown in FIG. 8, the processor 170 may extract interval $t_2 \sim t_3$, interval $t_4 \sim t_5$, interval $t_6 \sim t_7$, and interval $t_8 \sim t_9$ as voice intervals 820 in the pre-processed audio signal 810 as a result of VAD.

In addition, the processor 170 may set a wake-up word recognition interval 830 including the extracted voice interval 820 and a buffer interval corresponding to the voice interval 820. Specifically, the processor 170 may set, as a first buffer interval, a preceding interval having a first length $T_1$ from each extracted voice interval 820, set, as a second buffer interval, a subsequent interval having a second length $T_2$ from each extracted voice interval 820, and set the wake-up word recognition interval 830 including the extracted voice interval 820 and buffer intervals corresponding thereto.

In FIG. 8, although size $T_1$ of the first buffer interval is smaller than size T2 of the second buffer interval, the present disclosure is not limited thereto. According to various embodiments, the size of the first buffer interval and the size of the second buffer interval may be equal, or the size of the first buffer interval may be larger than the size of the second buffer interval. For example, the size of the first buffer interval may be set to 4 seconds, and the size of the second buffer interval may be set to 3 seconds.

In the example shown in FIG. 8, the processor 170 may set, as buffer intervals, interval $t_1 \sim t_2$, interval $t_3 \sim t_4$, interval $t_5 \sim t_6$, interval $t_7 \sim t_8$, and interval $t_9 \sim t_{10}$ in the pre-processed audio signal 810, and set, as the wake-up word recognition interval 830, interval $t_1 \sim t_{10}$ including the voice interval 820 and the buffer interval. The buffer interval $t_3 \sim t_4$ may be a second buffer interval for the voice interval $t_2 \sim t_3$ and a first buffer interval for the voice interval $t_4 \sim t_5$ at the same time. In other words, a buffer interval between two adjacent voice intervals may be a first buffer interval and a second buffer interval at the same time.

In the pre-processed audio signal 810, an interval other than the wake-up word recognition interval 830 may be referred to as an idle interval. In the example shown in FIG. 8, interval $t_0 \sim t_1$ and interval $t_{10} \sim t_{11}$ are idle intervals.

The processor 170 may set a first buffer interval corresponding to the voice interval using a circular queue. For example, the processor 170 may sequentially fill the circular queue having a length of 5 seconds with the pre-processed audio signal, and when voice activation is detected in the circular queue and a voice interval is extracted, the processor 170 may set, as the first buffer interval, a preceding interval having a predetermined length (e.g., 4 seconds) from the extracted voice interval. A size (or length) of the circular queue is larger than a size (or length) of the first buffer interval.

The processor 170 may set a second buffer interval corresponding to the voice interval using a timer. For example, when the extracted voice interval terminates, the processor 170 may activate the timer having a predetermined length (e.g., 3 seconds) and determine whether a new voice interval is extracted within a time of the timer. If a new voice interval is extracted within the time of the timer, the processor 170 may re-activate the timer again having the predetermined length from a termination time of the new voice interval and determine whether another new voice interval is extracted within the time of the timer. An interval of the time of the timer corresponding to a predetermined length from a termination time of the voice interval may be set as the second buffer interval.

In addition, the processor 170 may transfer only the wake-up word recognition interval 830 of the pre-processed audio signal 810 to each wake-up word recognition engine.

In the example shown in FIG. 8, the processor 170 may transfer only the wake-up word recognition interval 830, $t_1 \sim t_{10}$, of the pre-processed audio signal 810 to each of the wake-up word recognition engines. In the related art, the processor 170 needs to transfer the interval $t_0 \sim t_{11}$, which is the entire interval of the pre-processed audio signal 810, to each wake-up word recognition engine. By contrast, in the present disclosure, the processor 170 transfers only the interval $t_1 \sim t_{10}$, which is a partial wake-up word recognition interval, to each wake-up word recognition engine, thereby effectively reducing the amount of CPU computation. As such, when compared with the related art, the present disclosure may prevent unnecessary waste of resources in an idle interval.

Figure 9:
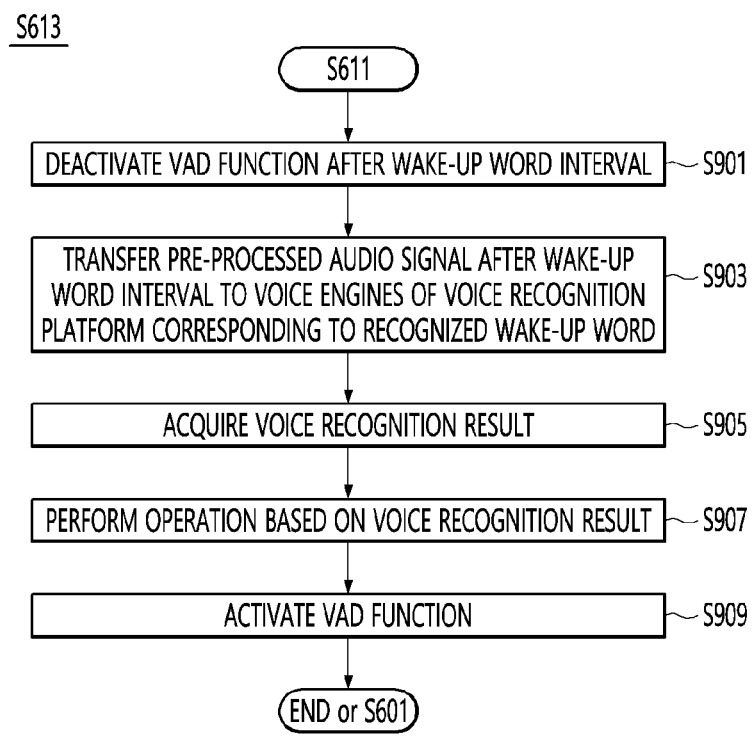
FIG. 9 is a flowchart illustrating an example of step S613 of providing a voice recognition service shown in FIG. 6.

FIG. 9 is a flowchart illustrating an example of step S613 of providing the voice recognition service shown in FIG. 6.

Referring to FIG. 9, the processor 170 is configured to deactivate the VAD (VAD) function after the wake-up word interval (S901).

The processor 170 is configured to extract a voice interval through VAD from the pre-processed audio signal in order to recognize a wake-up word, and to set a wake-up word recognition interval based on the extracted voice interval. However, after the wake-up word is recognized, the intention of the spoken voice included in the pre-processed audio signal is recognized using the speech engines of the voice recognition platform corresponding to the recognized wake-up word, so it is unnecessary to set the wake-up word recognition interval. Accordingly, the processor 170 may be configured to deactivate the VAD function after the wake-up word interval in which the wake-up word is recognized.

The processor 170 deactivates the VAD function because it is not necessary to set the wake-up word recognition interval, but also to guarantee performance of the voice engines because the entire interval of the original audio signal (including an ambient sound, as well as the extracted voice intervals) is used for learning of the voice engines according to VAD.

Also, the processor 170 is configured to transfer the pre-processed audio signal after the wake-up word interval to the voice engines of the voice recognition platform corresponding to the recognized wake-up word (S903).

As described above, the voice engines may be stored in the memory 140 or may be stored in an external server (voice server). The processor 170 may be configured to provide the voice recognition service based on the specific voice recognition platform in which the wake-up word is recognized by transmitting the pre-processed audio signal after the wake-up word interval to the voice engines of the voice recognition platform corresponding to the recognized wake-up word among the voice engines of the various voice recognition platforms.

The wake-up word interval may refer to an interval of the recognized wake-up word. An interval after the wake-up word interval in the pre-processed audio signal may include a command as a target of voice recognition, which may be referred to as a command recognition interval.

Also, the processor 170 is configured to acquire a voice recognition result (S905).

The processor 170 is configured to transmit the pre-processed audio signal after the wake-up word interval to speech engines (e.g., STT engine, NLP engine, voice synthesis engine, etc.) stored in the memory 140 to recognize an intention of the spoken voice included in the pre-processed audio signal and determine a voice recognition result (e.g., control or response) corresponding thereto. Alternatively, the processor 170 may be configured to transmit the pre-processed audio signal after the wake-up word interval to an external server (or voice server) through the communication interface 110 and receive a voice recognition result (e.g., control or response) corresponding to the intention of the spoken voice included in the pre-processed audio signal transmitted from the external server (or voice server).

Also, the processor 170 is configured to perform an operation based on the voice recognition result (S907).

The processor 170 may perform control corresponding to the input spoken voice based on the voice recognition result, output a response corresponding to the input spoken voice, or perform both functions.

Also, the processor 170 is configured to activate the VAD function (S909).

Since the voice recognition function has been performed after the wake-up word is spoken, the processor 170 may activate the VAD function to recognize the wake-up word.

The order of the steps shown in FIG. 9 is only an example, and the present disclosure is not limited thereto. That is, in an embodiment, the order of some of the steps shown in FIG. 9 may be interchanged and performed. In addition, in an embodiment, some of the steps shown in FIG. 9 may be performed in parallel. In addition, only some of the steps shown in FIG. 9 may be performed.

Figure 10:
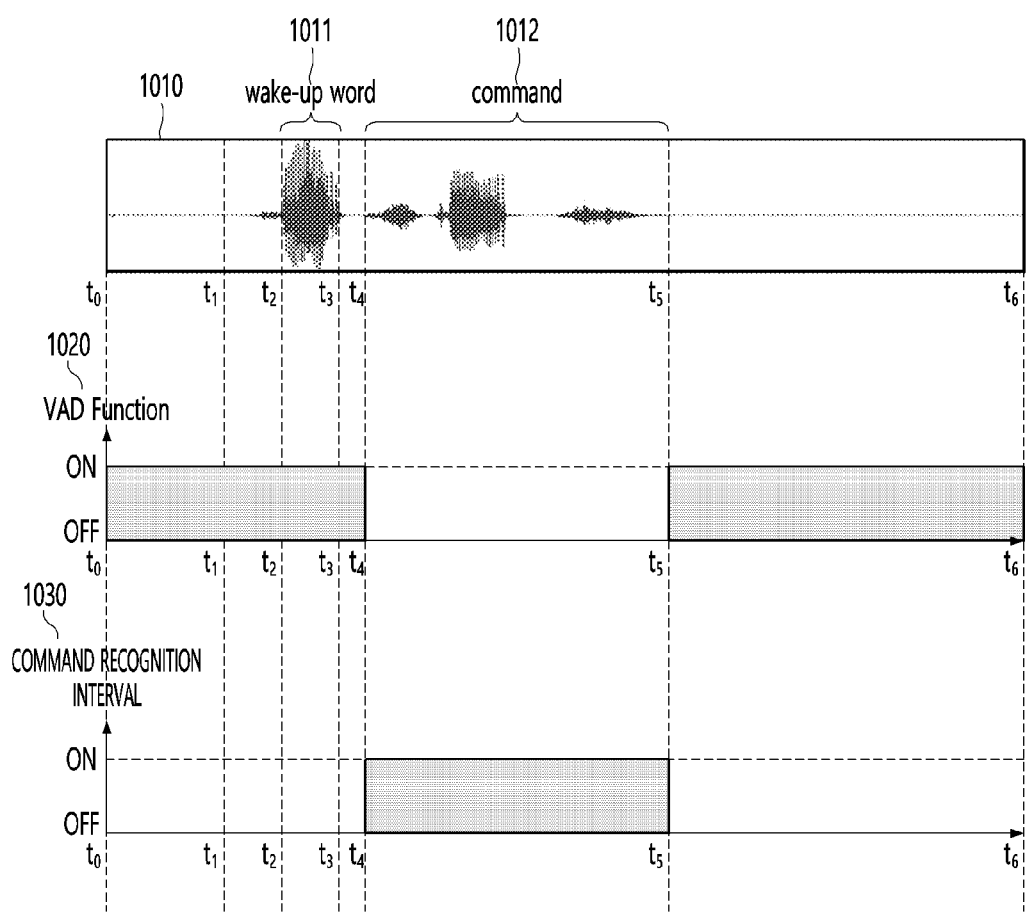
FIG. 10 is a view illustrating an example of controlling a voice activation detection (VAD) function according to wake-up word recognition.

FIG. 10 is a view illustrating an example of controlling a VAD function according to recognition of a wake-up word.

Referring to FIG. 10, when a pre-processed audio signal 1010 is acquired, the processor 170 may activate a VAD function 1020 to recognize a wake-up word 1011.

In the example shown in FIG. 10, the wake-up word 1011 is included in interval $t_2 \sim t_3$ in the pre-processed audio signal 1010. The processor 170 may recognize the wake-up word 1011 in the interval $t_2 \sim t_3$ and deactivate the VAD function 1020 to recognize a command 1012 included in the spoken voice at a time point $t_3$ or at a time point $t_4$ after a predetermined interval from the time $t_3$. For example, the time point $t_4$ may be a time point 1 second after the time point $t_3$ when the wake-up word terminates.

In addition, the processor 170 may set, as a command recognition interval 1030, an interval of the pre-processed audio signal 1010 in which the VAD function 1020 is deactivated.

In the example shown in FIG. 10, the processor 170 may set, as the command recognition interval 1030, the interval $t_4 \sim t_5$ in which the VAD function 1020 is deactivated, and transfer the command recognition interval 1030 to the voice engines of the voice recognition platform corresponding to the recognized wake-up word 1011, thereby acquiring a voice recognition result for the command 1012.

Further, the processor 170 may activate the VAD function 1020 when recognition of the command 1012 terminates.

In the example shown in FIG. 10, the processor 170 may activate the VAD function 102 after the time point is when the recognition of the command 1012 terminates.

In this way, when recognizing a command, only the pre-processed audio signal with the VAD function deactivated is transmitted to the speech engines, so that the command included in the pre-processed audio signal may be more accurately recognized.

Figure 11:
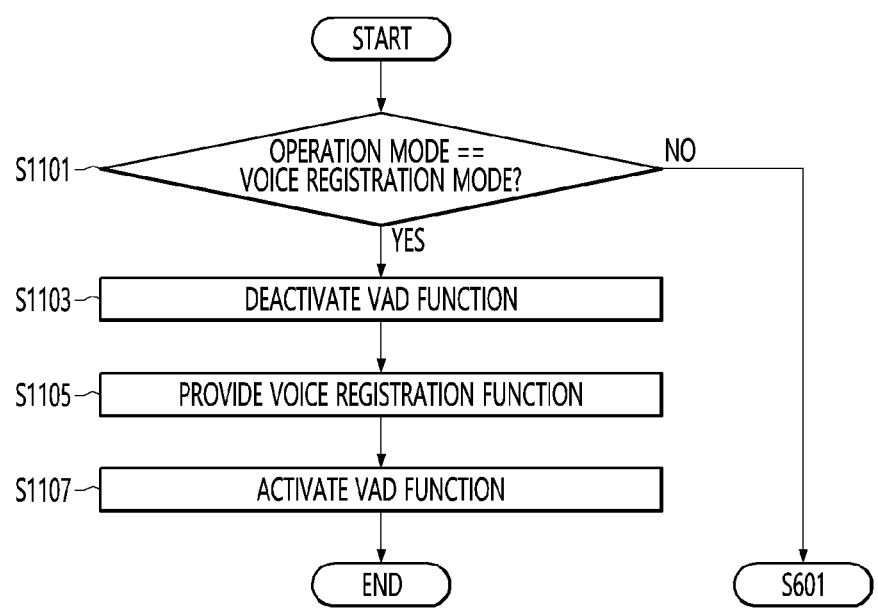
FIG. 11 is a flowchart illustrating a method for recognizing a plurality of voice recognition wake-up words according to an embodiment of the present disclosure.

FIG. 11 is a flowchart illustrating a method for recognizing a plurality of voice recognition wake-up words according to an embodiment of the present disclosure.

Referring to FIG. 11, the processor 170 is configured to determine whether a current operation mode is a voice registration mode (S1101).

The voice registration mode refers to a mode for registering a voice of a specific user in providing a voice recognition service, and may be provided to increase accuracy of voice recognition for individual users or to set different voice recognition setting values for each user.

If the operation mode is the voice registration mode as a result of the determination of step S1101, the processor 170 is configured to deactivate the VAD function (S1103) and to provide the voice registration function (S1105), and when the voice registration function terminates, the processor 170 is configured to activate the VAD function (S1107).

In that the voice registration mode is a mode for registering a voice of a specific user, it is preferable to register the user's voice using an audio signal (or pre-processed audio signal) from which only noise or echo is removed. Accordingly, the processor 170 may be configured to provide a function of deactivating the VAD function and registering the user's voice. For example, the processor 170 may provide a function of registering the user's voice by providing a voice registration interface.

If the operation mode is not the voice registration mode as a result of the determination in step S1101, the processor 170 is configured to perform step S601 of acquiring an input audio signal.

When the artificial intelligence apparatus 100 does not operate in the voice registration mode, the processor 170 may perform steps S601 to S613 shown in FIG. 6 for recognizing a wake-up word.

The order of the steps shown in FIG. 11 is only an example, and the present disclosure is not limited thereto. That is, in an embodiment, the order of some of the steps shown in FIG. 11 may be interchanged and performed. Further, in an embodiment, some of the steps shown in FIG. 11 may be performed in parallel. Also, only some of the steps illustrated in FIG. 11 may be performed.

FIG. 11 shows a single cycle of a method for recognizing a plurality of voice recognition wake-up words, and the method for recognizing a plurality of voice recognition wake-up words shown in FIG. 11 may be repeatedly performed. That is, after the step S1107 of activating the VAD function is performed, the step S1101 of determining whether the operation mode is the voice registration mode may be performed again.

FIG. 12 is a view illustrating a voice registration interface according to an embodiment of the present disclosure.

Referring to FIG. 12, a voice registration interface 1210 includes an instruction 1211 requesting a user to set up a wake-word by uttering a wake-up word until the wake-up word is recognized a predetermined number of times and information 1212 indicating the number of times the wake-word is successfully recognized. Furthermore, the voice registration interface 1210 may further include a sound visualization image 1213 whose color or shape changes according to an input sound. The user may check whether sound is currently input to the display device 100 through the sound visualization image 1213.

The processor 170 may be configured to provide a voice registration interface 1210 as shown in (a) of FIG. 12 for registering a new voice, and provide a voice registration interface 1210 as shown in (b) of FIG. 12 for re-registering a previously registered voice.

Although not shown in FIG. 12, when the user's voice is successfully acquired through the voice registration interface 1210 shown in FIG. 12, the processor 170 may be configured to provide an interface for setting the name or title of the voice.

Figure 13:
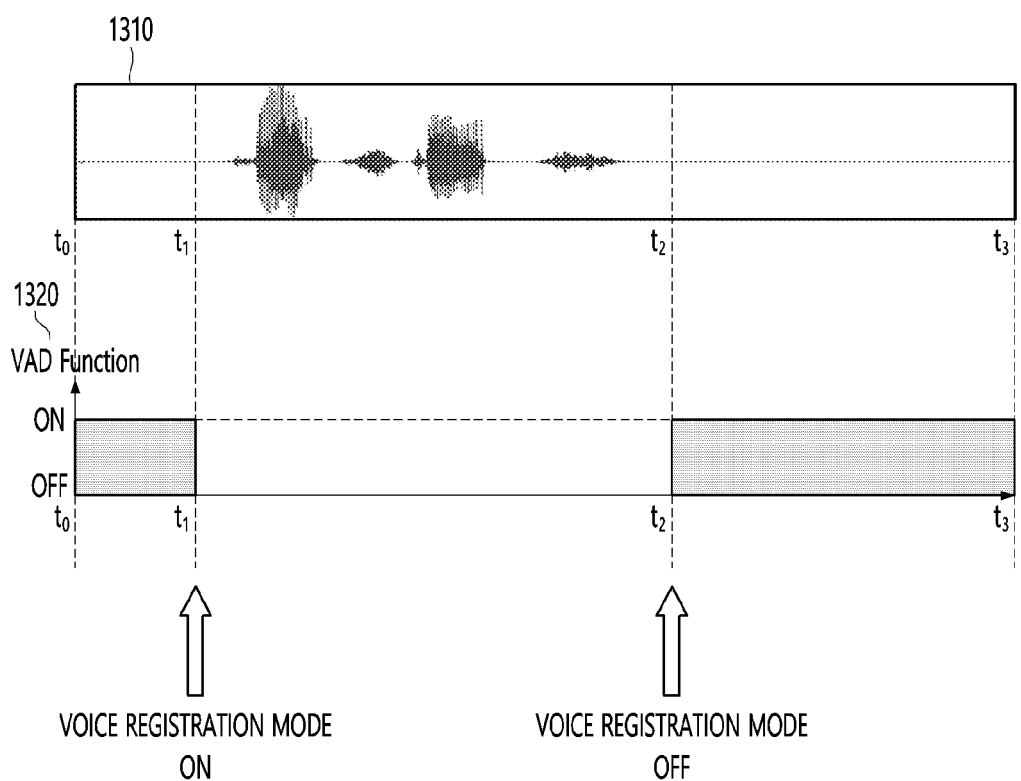
FIG. 13 is a view illustrating an example of controlling a VAD function in a voice registration mode.

FIG. 13 is a view illustrating an example of controlling a VAD function in a voice registration mode.

Referring to FIG. 13, when the operation mode of the artificial intelligence apparatus 100 is the voice registration mode, the processor 170 may deactivate a VAD function 1320 and provide a voice registration function, while the voice registration mode is activated.

In the example shown in FIG. 13, the voice registration mode is activated at a time point $t_1$, the voice registration mode is deactivated at a time point $t_2$, and the processor 170 may deactivate the VAD function 1320 in the interval $t_1$~$t_2$. In addition, the processor 170 may register a user's voice using the interval $t_1$~$t_2$ in a pre-processed audio signal 1310.

Figure 14:
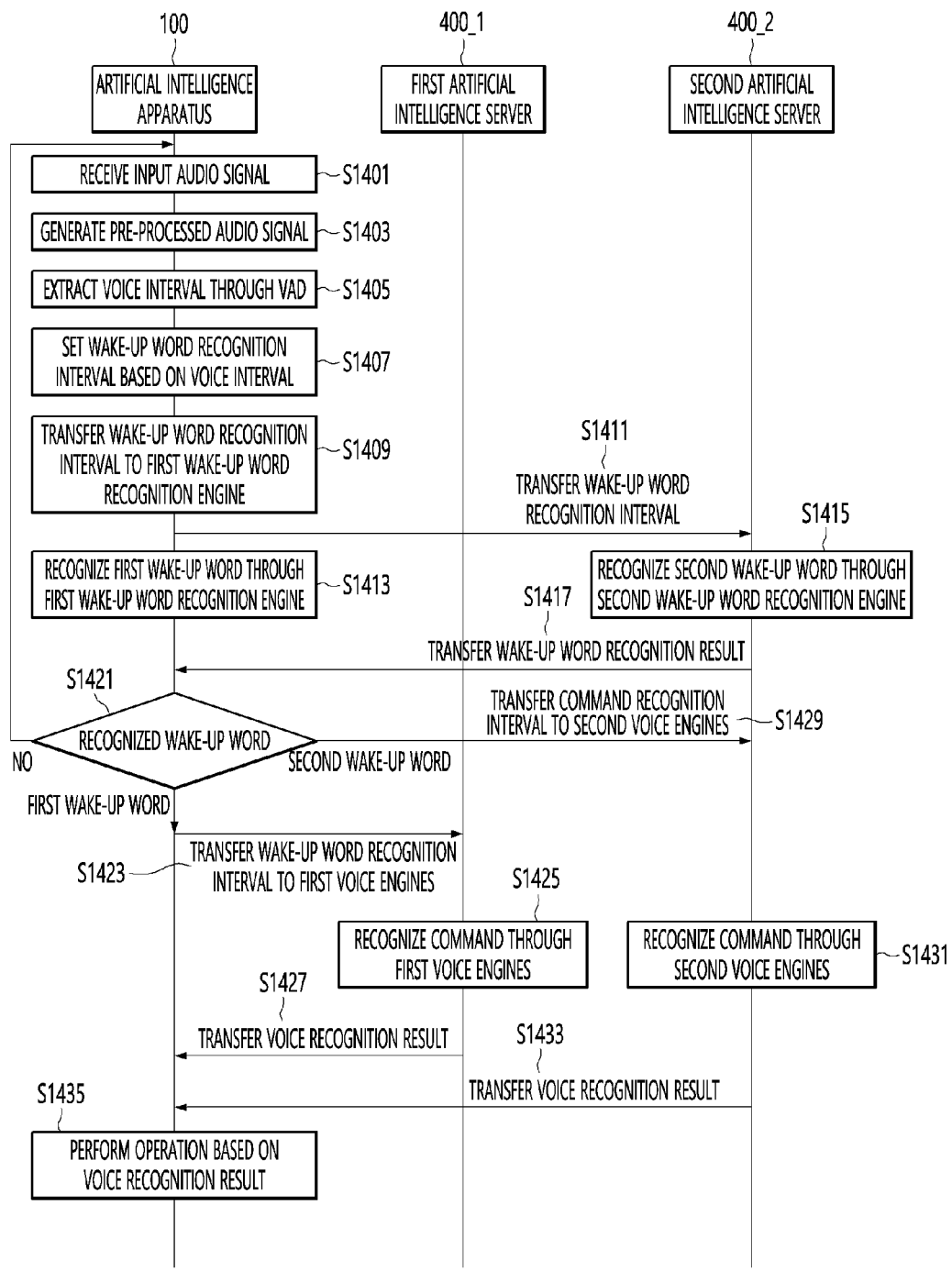
FIG. 14 is a ladder diagram illustrating a method for recognizing a plurality of wake-up words according to an embodiment of the present disclosure.

FIG. 14 is a ladder diagram illustrating a method for recognizing a plurality of wake-up words according to an embodiment of the present disclosure.

Referring to FIG. 14, the artificial intelligence apparatus 100 may support a first voice recognition platform and a second voice recognition platform and may mount a first wake-up word recognition engine for recognizing a first wake-up word corresponding to the first voice recognition platform and may not mount a second wake-up word recognition engine for recognizing a second wake-up word corresponding to the second voice recognition platform. For example, the second voice recognition platform may refer to an external voice recognition platform based on the artificial intelligence apparatus 100, and the artificial intelligence apparatus 100 may provide a voice recognition service of the second voice recognition platform using an application programming interface (API). The first wake-up word may include a plurality of wake-up words, and similarly, the second wake-up word may include a plurality of wake-up words.

A first artificial intelligence server 400_1 refers to an artificial intelligence server 400 that provides a voice recognition service of the first voice recognition platform, and may store at least one of a first wake-up word recognition engine or a first voice recognition engine for the first voice recognition platform. A second artificial intelligence server 400_2 refers to an artificial intelligence server 400 that provides a voice recognition service of the second voice recognition platform, and may store at least one of a second wake-up word recognition engine or a second voice recognition engine for the second voice recognition platform.

The processor 170 of the artificial intelligence apparatus 100 receives an input audio signal (S1401), generates a pre-processed audio signal from the input audio signal (S1403), extracts a voice interval through VAD from the pre-processed audio signal (S1405), and sets a wake-up word recognition interval based on the voice interval (S1407).

Also, the processor 170 of the artificial intelligence apparatus 100 transfers the wake-up word recognition interval to the first wake-up word recognition engine stored in the memory 140 (S1409), and recognizes a first wake-up word through the first wake-up word recognition engine (S1413).

The processor 170 of the artificial intelligence apparatus 100 transfers the wake-up word recognition interval to the second artificial intelligence server 400_2 storing the second wake-up word recognition engine through the communication interface 110 (S1411), and the processor 460 of the second artificial intelligence server 400_2 recognizes a second wake-up word through the second wake-up word recognition engine (S1415) and transfers a wake-up word recognition result to the artificial intelligence apparatus 100 through the communication interface 410 (S1417).

The processor 170 may transfer the wake-up word recognition interval to the second artificial intelligence server 400_2 using an API for the second wake-up word recognition engine provided by the second artificial intelligence server 400_2, and acquire a wake-up word recognition result for the wake-up word.

Since the artificial intelligence apparatus 100 may recognize both the first wake-up word corresponding to the first voice recognition platform and the second wake-up word corresponding to the second voice recognition platform, the steps (S1409 and S1413) of recognizing the first wake-up word and the steps (S1411, S1415, and S1417) of recognizing the second wake-up word may be performed in parallel with each other.

Also, the processor 170 of the artificial intelligence apparatus 100 determines which wake-up word is recognized (S1421).

If the wake-up word is not recognized as a result of the determination of step S1421, the process proceeds to step S1401 of receiving an input audio signal.

If the recognized wake-up word is the first wake-up word as a result of the determination of step S1421, the processor 170 of the artificial intelligence apparatus 100 transfers the command recognition interval to the first artificial intelligence server 400_1 storing the first voice engines through the communication interface 110 (S1423), and the processor 460 of the first artificial intelligence server 400_1 recognizes the command through the first voice engines (S1425) and transfers the voice recognition result to the artificial intelligence apparatus 100 through the communication interface 410 (S1427).

The processor 170 may transfer the command recognition interval to the first artificial intelligence server 400_1 using an API for the first speech engines provided by the first artificial intelligence server 400_1, and acquire the voice recognition result.

If the recognized wake-up word is the second wake-up word as a result of the determination of step S1421, the processor 170 of the artificial intelligence apparatus 100 transfers the command recognition interval to the second artificial intelligence server 400_1 that stores the second voice engines through the communication interface 110 (S1429), and the processor 460 of the second artificial intelligence server 400_2 recognizes the command through the second voice engines (S1431) and transfers the voice recognition result to the artificial intelligence apparatus 100 through the communication interface 410 (S1433).

The processor 170 may transfer the command recognition interval to the second artificial intelligence server 400_2 using an API for the second speech engines provided by the second artificial intelligence server 400_2, and acquire a voice recognition result.

Also, the processor 170 of the artificial intelligence apparatus 100 performs an operation based on the acquired voice recognition result (S1435).

The order of the steps shown in FIG. 14 is only an example, and the present disclosure is not limited thereto. That is, in an embodiment, the order of some of the steps shown in FIG. 14 may be interchanged and performed. Further, in an embodiment, some of the steps shown in FIG. 14 may be performed in parallel. Also, only some of the steps illustrated in FIG. 14 may be performed.

FIG. 14 shows a single cycle of a method for recognizing a plurality of voice recognition wake-up words, and the method for recognizing a plurality of voice recognition wake-up words shown in FIG. 14 may be repeatedly performed. That is, after performing the step S1435 of performing an operation based on the result of voice recognition, the step S1401 of receiving the input audio signal may be performed again.

FIG. 14 illustrates an embodiment in which the first voice engines are stored in the first artificial intelligence server 400_1, but the present disclosure is not limited thereto. That is, in an embodiment, the artificial intelligence apparatus 100 may store not only the first wake-up word recognition engine but also the first voice engines, and the artificial intelligence apparatus 100 may directly provide voice recognition service of the first voice recognition platform without passing through the first artificial intelligence server 400_1.

Figure 15:
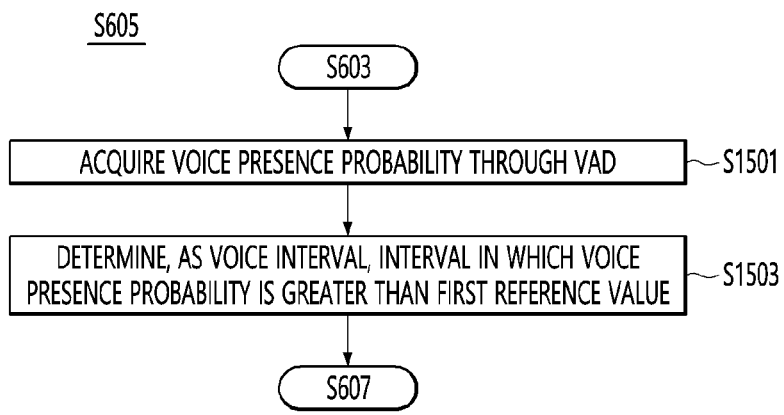
FIG. 15 is a flowchart illustrating an example of step S605 of extracting a voice interval shown in FIG. 6.

FIG. 15 is a flowchart illustrating an example of step S605 of extracting a voice interval shown in FIG. 6.

Referring to FIG. 15, the processor 170 of the artificial intelligence apparatus 100 is configured to acquire a voice presence probability through VAD from a pre-processed audio signal (S1501).

The processor 170 may acquire a probability or possibility that a voice exists at each time point of the pre-processed audio signal through VAD.

In addition, the processor 170 of the artificial intelligence apparatus 100 is configured to determine, as a voice interval, an interval in which the voice presence probability is greater than a first reference value (S1503).

That is, the processor 170 may extract a voice interval from the pre-processed audio signal based on only the voice presence probability.

Figure 16:
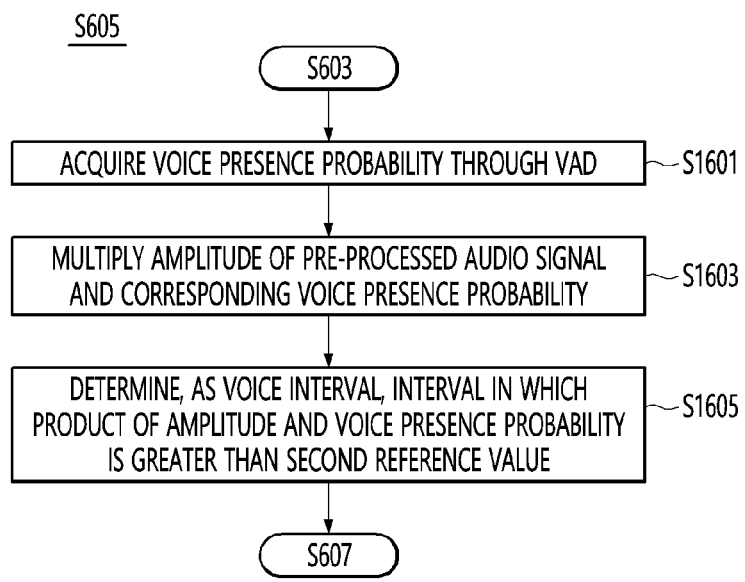
FIG. 16 is a flowchart illustrating an example of step S605 of extracting the voice interval shown in FIG. 6.

FIG. 16 is a flowchart illustrating an example of step S605 of extracting a voice interval shown in FIG. 6.

Referring to FIG. 16, the processor 170 of the artificial intelligence apparatus 100 is configured to acquire a voice presence probability through VAD from a pre-processed audio signal (S1601).

Also, the processor 170 of the artificial intelligence apparatus 100 is configured to multiply an amplitude of the pre-processed audio signal and the corresponding voice presence probability (S1603).

The pre-processed audio signal may be expressed as an amplitude for each time, and the processor 170 may multiply the amplitude of the pre-processed audio signal for each time and the corresponding voice presence probability.

In addition, the processor 170 of the artificial intelligence apparatus 100 is configured to determine, as a voice interval, an interval in which the product of the amplitude of the pre-processed audio signal and the voice presence probability is greater than the second reference value (S1605).

That is, the processor 170 may extract a voice interval from the pre-processed audio signal by considering not only the voice presence probability but also the pre-processed audio signal.

As a result of actual experiment, wake-up word recognition performance was better in the case (example of FIG. 16) where the voice interval is determined based on the product of the amplitude of the pre-processed audio signal and the voice presence probability rather than the case (example of FIG. 15) where the voice interval is determined simply based on only the voice presence probability.

Figure 17:
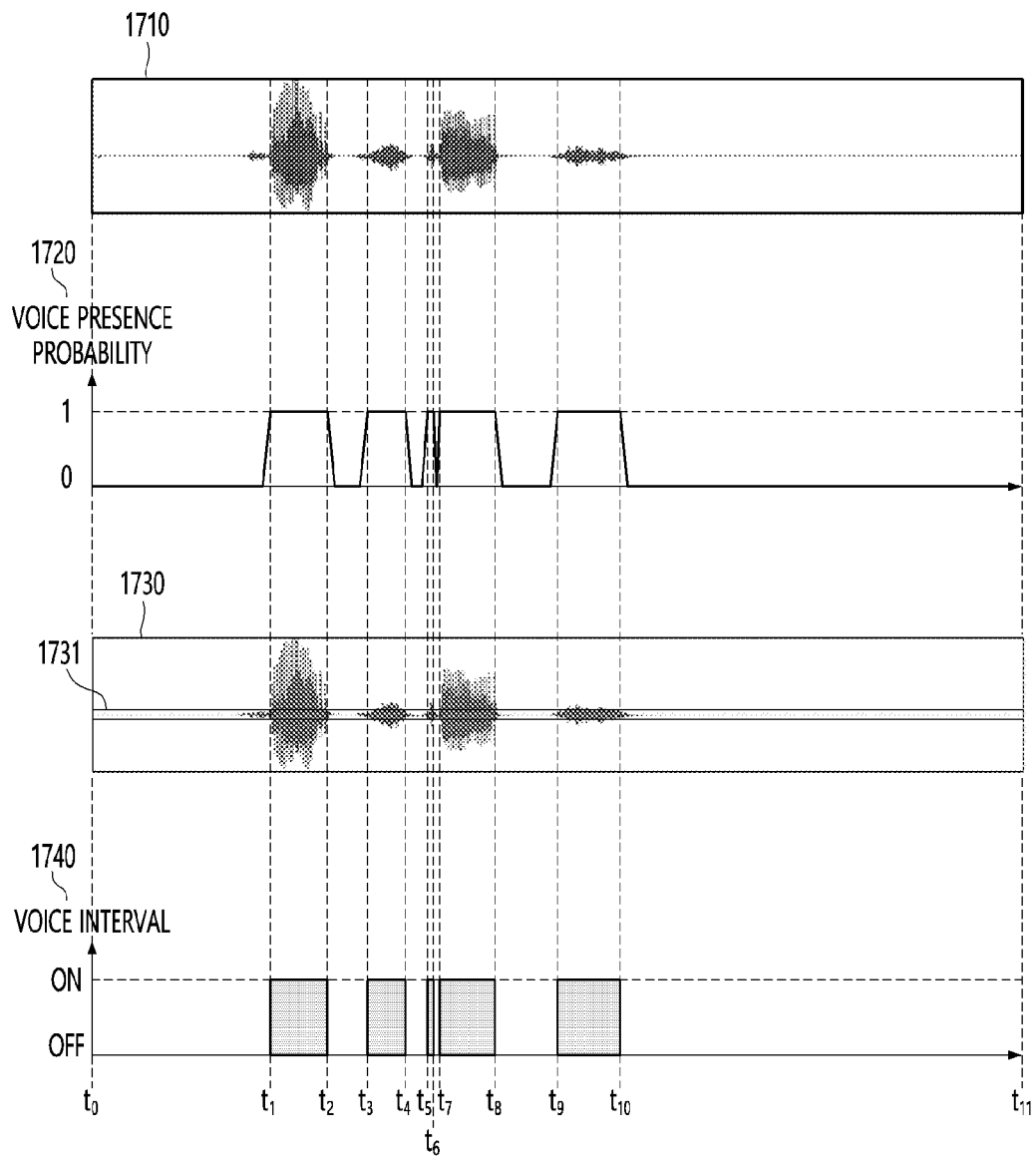
FIG. 17 is a view illustrating a method for extracting a voice interval from a pre-processed audio signal.

FIG. 17 is a view illustrating a method for extracting a voice interval from a pre-processed audio signal.

Referring to FIG. 17, when the processor 170 acquires a pre-processed audio signal 1710, the processor 170 may acquire a voice presence probability 1720 corresponding to the pre-processed audio signal 1710 through VAD.

In addition, the processor 170 may determine and extract, as a voice interval 1740, an interval in which a value 1730 obtained by multiplying the amplitude of the pre-processed audio signal 1710 and the voice presence probability 1720 is greater than a predetermined reference value 1731.

In the example shown in FIG. 17, the processor 170 may extract, as the voice interval 1740, interval $t_1 \sim t_2$, interval $t_3 \sim t_4$, interval $t_5 \sim t_6$, interval $t_7 \sim t_8$, and interval $t_9 \sim t_{10}$ in which the value 1730 obtained by multiplying the amplitude of the pre-processed audio signal 1710 and the voice presence probability 1720 is greater than the predetermined reference value 1731.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

Other implementations are within the scope of the following claims.

What is claimed is:

1. An artificial intelligence apparatus for recognizing a plurality of wake-up words, the artificial intelligence apparatus comprising:
a microphone;

a memory configured to store a first wake-up word recognition engine;
a wireless transceiver configured to communicate with a server configured to store a second wake-up word recognition engine; and
a processor configured to:
acquire an audio signal through the microphone,
generate a pre-processed audio signal from the acquired audio signal,
extract a voice interval from the generated pre-processed audio signal through a voice activation detection (VAD) function, wherein the voice interval is associated with a portion of the audio signal corresponding to a voice,
set a wake-up word recognition interval comprising the extracted voice interval and a buffer interval corresponding to the extracted voice interval in the generated pre-processed audio signal, wherein the wake-up word recognition interval is an interval used for recognizing wake-up words,
transmit the set wake-up recognition interval in the generated pre-processed audio signal to the first wake-up word recognition engine and the second wake-up word recognition engine,
acquire a first wake-up word recognition result for a first wake-up word through the first wake-up word recognition engine, and to acquire a second wake-up word recognition result for a second wake-up word through the second wake-up word recognition engine,
deactivate the VAD function in response to recognizing the first wake-up word or the second wake-up word,
acquire a voice recognition result for a command recognition interval after a wake-up word interval for a recognized wake-up word in the generated pre-processed audio signal, wherein the wake-up word interval refers to an interval of the recognized wake-up word,
perform an operation based at least in part on the acquired voice recognition result, and
activate the VAD function.

2. The artificial intelligence apparatus of claim 1, wherein the wake-up word recognition interval further comprises a first buffer interval and a second buffer interval, wherein the first buffer interval is set based at least in part on a preceding interval having a first length from the voice interval and the second buffer interval is set based at least in part on a subsequent interval having a second length from the voice interval.

3. The artificial intelligence apparatus of claim 1, wherein the voice recognition result for the command recognition interval is acquired based at least in part on using speech engines of a voice recognition platform corresponding to the recognized wake-up word, wherein the speech engines comprise at least a speech-to-text (STT) engine, a natural language processing (NLP) engine, or a voice synthesis engine.

4. The artificial intelligence apparatus of claim 1, wherein the processor is further configured to:
transmit the wake-up word recognition interval to the server using an application programming interface (API) for the second wake-up word recognition engine, and
acquire the second wake-up word recognition result for the second wake-up word.

5. The artificial intelligence apparatus of claim 1, wherein the processor is further configured to acquire a voice presence probability from the generated pre-processed audio signal using the VAD function, wherein the voice interval is extracted based at least in part on the acquired voice presence probability.

6. The artificial intelligence apparatus of claim 5, wherein the voice interval is extracted based at least in part on extracting an interval in which the acquired voice presence probability is greater than a first reference value.

7. The artificial intelligence apparatus of claim 5, wherein the voice interval is extracted based at least in part on extracting an interval in which a value obtained by multiplying an amplitude of the pre-processed audio signal and the voice presence probability is greater than a second reference value.

8. The artificial intelligence apparatus of claim 1, wherein the processor is further configured to deactivate the VAD function based on the artificial intelligence apparatus operating in a voice registration mode and to activate the VAD function after a voice registration function in the voice registration mode terminates.

9. A method for recognizing a plurality of wake-up words, the method comprising:
acquiring an audio signal through a microphone;
generating a pre-processed audio signal from the acquired audio signal;
extracting a voice interval from the generated pre-processed audio signal through a voice activation detection (VAD) function, wherein the voice interval is associated with a portion of the audio signal corresponding to a voice;
setting a wake-up word recognition interval comprising the extracted voice interval and a buffer interval corresponding to the extracted voice interval in the generated pre-processed audio signal, wherein the wake-up word recognition interval is an interval used for recognizing wake-up words;
transmitting the set wake-up word recognition interval in the generated pre-processed audio signal to a first wake-up word recognition engine stored in a memory and a second wake-up word recognition engine stored in an artificial intelligence servers;
acquiring a first wake-up word recognition result for a first wake-up word through the first wake-up word recognition engine, and acquiring a second wake-up word recognition result for a second wake-up word through the second wake-up word recognition engine;
deactivating the VAD function in response to recognizing the first wake-up word or the second wake-up word;
acquiring a voice recognition result for a command recognition interval after a wake-up word interval for a recognized wake-up word in the generated pre-processed audio signal, wherein the wake-up word interval refers to an interval of the recognized wake-up word;
performing an operation based at least in part on the acquired voice recognition result; and
activating the VAD function.

10. The method of claim 9, wherein the wake-up word recognition interval further comprises a first buffer interval and a second buffer interval, wherein the first buffer interval is set based at least in part on a preceding interval having a first length from the voice interval and the second buffer interval is set based at least in part on a subsequent interval having a second length from the voice interval.

11. The method of claim 9, wherein the voice recognition result for the command recognition interval is acquired based at least in part on using speech engines of a voice recognition platform corresponding to the recognized wake-up word, wherein the speech engines comprise at least a speech-to-text (STT) engine, a natural language processing (NLP) engine, or a voice synthesis engine.

12. A non-transitory recording medium storing one or more programs, which, when executed by one or more processors of a device, cause the device to perform operations comprising:

acquiring an audio signal through a microphone;
generating a pre-processed audio signal from the audio signal;
extracting a voice interval from the pre-processed audio signal through a voice detection activation function (VAD);
setting a wake-up word recognition interval including the voice interval and a buffer interval corresponding to the voice interval in the pre-processed audio signal;
transmitting the wake-up word recognition interval of the pre-processed audio signal to a first wake-up word recognition engine stored in a memory and a second wake-up word recognition engine stored in an artificial intelligence server;
acquiring a first wake-up word recognition result for a first wake-up word through the first wake-up word recognition engine, and acquiring a second wake-up word recognition result for a second wake-up word through the second wake-up word recognition engine;
deactivating the VAD function in response to recognizing the first wake-up word or the second wake-up word;
acquiring a voice recognition result for a command recognition interval after a wake-up word interval for a recognized wake-up word in the generated pre-processed audio signal, wherein the wake-up word interval refers to an interval of the recognized wake-up word;
performing an operation based at least in part on the acquired voice recognition result; and
activating the VAD function.

13. The non-transitory recording medium of claim 12, wherein the wake-up word recognition interval further comprises a first buffer interval and a second buffer interval, wherein the first buffer interval is set based at least in part on a preceding interval having a first length from the voice interval and the second buffer interval is set based at least in part on a subsequent interval having a second length from the voice interval.

* * * * *